(12) United States Patent
Matsumoto et al.

(10) Patent No.: US 8,315,642 B2
(45) Date of Patent: *Nov. 20, 2012

(54) INTEGRATED CIRCUIT FOR CONTROLLING RADIO COMMUNICATION

(75) Inventors: Atsushi Matsumoto, Ishikawa (JP); Daichi Imamura, Kanagawa (JP); Takashi Iwai, Ishikawa (JP); Yoshihiko Ogawa, Kanagawa (JP); Tomofumi Takata, Ishikawa (JP); Katsuhiko Hiramatsu, Leuven (BE)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/402,311

(22) Filed: Feb. 22, 2012

(65) Prior Publication Data

US 2012/0147847 A1 Jun. 14, 2012

Related U.S. Application Data

(63) Continuation of application No. 12/968,139, filed on Dec. 14, 2010, now Pat. No. 8,145,231, which is a continuation of application No. 12/673,482, filed as application No. PCT/JP2008/002212 on Aug. 13, 2008, now Pat. No. 8,125,953.

(30) Foreign Application Priority Data

Aug. 14, 2007 (JP) .................. 2007-211548
Feb. 5, 2008 (JP) .................. 2008-025535

(51) Int. Cl.
*H04W 72/08* (2009.01)
*H04W 72/04* (2009.01)
(52) U.S. Cl. .................. 455/452.1; 455/452.2; 455/509; 455/515

(58) Field of Classification Search .................. 455/450, 455/452.1, 452.2, 509, 507, 464, 511, 517, 455/67.11, 68, 515, 434; 370/319, 330, 341, 370/342, 320
See application file for complete search history.

(56) References Cited

U.S. PATENT DOCUMENTS

| | | | |
|---|---|---|---|
| 2007/0287385 A1 | 12/2007 | Stephenne | |
| 2007/0293233 A1 | 12/2007 | Inoue et al. | |
| 2008/0101306 A1 | 5/2008 | Bertrand et al. | |
| 2009/0116599 A1* | 5/2009 | McCoy | 375/362 |
| 2010/0040036 A1* | 2/2010 | Ofuji et al. | 370/344 |

(Continued)

OTHER PUBLICATIONS

Freescale Semiconductor, "On the Need for Sounding RS Hopping," R1-072528, 3rd Generation Partnership Project (3GPP™) TSG RAN1 Meeting #49, Kobe, Japan, May 7-11, 2007, pp. 1-3.

(Continued)

*Primary Examiner* — John J Lee
(74) *Attorney, Agent, or Firm* — Seed IP Law Group PLLC

(57) ABSTRACT

Provided is a radio communication device which can prevent interference between SRS and PUCCH when the PUCCH transmission bandwidth fluctuates and suppress degradation of CQI estimation accuracy by the band where no SRS is transmitted. The device includes: an SRS code generation unit (201) which generates an SRS (Sounding Reference Signal) for measuring uplink line data channel quality; an SRS arrangement unit (202) which frequency-multiplexes the SRS on the SR transmission band and arranges it; and an SRS arrangement control unit (208) which controls SRS frequency multiplex so as to be uniform in frequency without modifying the bandwidth of one SRS multiplex unit in accordance with the fluctuation of the reference signal transmission bandwidth according to the SRS arrangement information transmitted from the base station and furthermore controls the transmission interval of the frequency-multiplexed SRS.

25 Claims, 29 Drawing Sheets

U.S. PATENT DOCUMENTS

2010/0118805 A1  5/2010  Ishii et al.
2010/0296480 A1  11/2010  Nouda et al.

OTHER PUBLICATIONS

Huawei, "Multiplexing of E-UTRA Uplink Sounding Reference Signals," R1-072095, 3rd Generation Partnership Project (3GPP™) TSG RAN WG1 Meeting #49, Kobe, Japan, May 7-11, 2007, pp. 1-3.

International Search Report, for corresponding International Application No. PCT/JP2008/002212, mailed Oct. 21, 2008.

NTT DoCoMo and Sharp, "Sounding RS Parameters in E-UTRA Uplink," R1-080242, 3rd Generation Partnership Project (3GPP™) TSG RAN WG1 Meeting #51bis, Sevilla, Spain, Jan. 14-18, 2008, pp. 1-4.

Japanese Office Action for corresponding JP Application No. 2009-528040, mailed Jul. 6, 2010, 3 pages.

Samsung, "PUCCH Transmission without Data in E-UTRA," R1-073093, 3GPP TSG RAN WG1 Meeting #49bis, Orlando, Florida, USA, Jun. 25-29, 2007, 5 pages.

Samsung, "Uplink Channel Sounding RS Structure," R1-072229, 3rd Generation Partnership Project (3GPP™) TSG RAN WG1 Meeting #49, Kobe, Japan, May 7-11, 2007, pp. 1-4.

Samsung, "Uplink Channel Sounding RS Structure," R1-073116, 3GPP TSG RAN WG1 Meeting #49bis, Orlando, Florida, USA, Jun. 25-29, 2007, 4 pages.

Texas Instruments, "Sounding Reference Signal Assignments in E-UTRA Uplink," R1-072849, 3GPP TSG RAN WG1 #49bis, Orlando, Florida, USA, Jun. 25-29, 2007, 7 pages.

\* cited by examiner

| NUMBER OF PUCCH CHANNELS | 1 | | | | 4 | | | |
| --- | --- | --- | --- | --- | --- | --- | --- | --- |
| MULTIPLEXING NUMBER OF SRS N | t=0 | t=1 | t=2 | t=3 | t=0 | t=1 | t=2 | t=3 |
| 0 | #0~#5 | #6~#11 | #12~#17 | #18~#23 | #2~#7 | #9~#14 | #16~#21 | - |
| 1 | #6~#11 | #12~#17 | #18~#23 | #0~#5 | #9~#14 | #16~#21 | - | #2~#7 |
| 2 | #12~#17 | #18~#23 | #0~#5 | #6~#11 | #16~#21 | - | #2~#7 | #9~#14 |
| 3 | #18~#23 | #0~#5 | #6~#11 | #12~#17 | - | #2~#7 | #9~#14 | #16~#21 |

FIG.16

INTEGRATED CIRCUIT FOR CONTROLLING RADIO COMMUNICATION

TECHNICAL FIELD

The present invention relates to a radio communication apparatus and a radio communication method.

BACKGROUND ART

Presently, in Third Generation Partnership Project Radio Access Network Long Term Evolution (3GPP RAN LTE), an uplink sounding reference signal (SRS) is studied. Here, "sounding" refers to channel quality estimation and an SRS is mainly subject to time-multiplexing and transmitted in a specific time slot in order to estimate a CQI (Channel Quality Indicator) of an uplink data channel and estimate timing offset between a base station and a mobile station.

Further, possible methods of transmitting an SRS include the method of transmitting an SRS in a specific time slot in wideband and estimating a CQI over wideband at a time, and the method of transmitting a narrowband SRS in a plurality of time slots with shifting frequency bands (frequency hopping) and estimating a CQI over wideband in several times.

Generally, a UE (User Equipment) located near a cell boundary has significant path loss and a limitation of maximum transmission power. Accordingly, if an SRS is transmitted in a wideband, received power for a base station per unit frequency decreases and received SNR (Signal to Noise Ratio) decreases, and, as a result, the accuracy of CQI estimation deteriorates. Therefore, a UE near a cell boundary adopts a narrowband SRS transmission method of narrowing limited power to a predetermined frequency band and performing transmission. In contrast, a UE near the center of a cell has small path loss and received power for a base station per unit frequency can be kept enough, and therefore adopts a wideband SRS transmission method.

Meanwhile, another purpose of transmitting an SRS is to estimate timing offset between a base station and a mobile station. Accordingly, to secure the given accuracy of timing estimation $\Delta t$, the SRS bandwidth in one transmission unit (one frequency multiplexing unit) needs to be equal to or more than $1/\Delta t$. That is, the bandwidth of an SRS in one transmission unit needs to fulfill both the accuracy of CQI estimation and the accuracy of timing estimation.

Further, in LTE, a PUCCH (Physical Uplink Control Channel), which is an uplink control channel, is frequency-multiplexed on both ends of the system band. Accordingly, an SRS is transmitted in the band subtracting the PUCCHs from the system bandwidth.

Further, the PUCCH transmission bandwidth (a multiple of the number of channels of one PUCCH bandwidth) varies according to the number of items of control data to be accommodated. That is, when the number of items of control data to be accommodated is small, the PUCCH transmission bandwidth becomes narrow (the number of channels becomes few) and, meanwhile, when the number of items of control data to be accommodated is great, the PUCCH transmission bandwidth becomes wide (the number of channels becomes large). Therefore, as shown in FIG. 1, when the PUCCH transmission bandwidth varies, the SRS transmission bandwidth also varies. In FIG. 1, the horizontal axis shows frequency domain, and the vertical axis shows time domain (same as below). In the following, the bandwidth of one channel of a PUCCH is simply referred to as the "PUCCH bandwidth" and the bandwidth by multiplying the PUCCH bandwidth by the number of channels is referred to as the "PUCCH transmission bandwidth." Likewise, the bandwidth of an SRS in one transmission unit is simply referred to as the "SRS bandwidth" and the bandwidth of an SRS in a plurality of transmission units is referred to as "SRS transmission bandwidth."

Non-Patent Document 1: 3GPP R1-072229, Samsung, "Uplink channel sounding RS structure," 7th-11 May 2007

DISCLOSURE OF INVENTION

Problems to be Solved by the Invention

In Non-Patent Document 1, the method shown in FIG. 2 is disclosed as a narrowband SRS transmission method in a case where a PUCCH transmission bandwidth varies. In the SRS transmission method disclosed in Non-Patent Document 1, as shown in FIG. 2, the SRS transmission bandwidth is fixed to the SRS transmission bandwidth of when the PUCCH transmission bandwidth is the maximum and is not changed even when the PUCCH transmission bandwidth varies. Further, as shown in FIG. 2, when an SRS is transmitted in a narrowband, the SRS is frequency-hopped and transmitted. According to the method described in Non-Patent Document 1, when the PUCCH transmission bandwidth is less than the maximum value shown in the bottom part of FIG. 2, bands in which SRSs are not transmitted are produced, and the accuracy of CQI estimation significantly deteriorates in the frequency domain.

Further, as shown in FIG. 3A, if the SRS transmission bandwidth is fixed to the SRS transmission bandwidth of when the PUCCH transmission bandwidth is the minimum, SRSs and PUCCHs interfere with each other when the PUCCH transmission bandwidth increases as shown in FIG. 3B, the PUCCH reception performance deteriorates.

To prevent SRSs and PUCCHs from interfering with each other as shown in FIG. 3B when the PUCCH transmission bandwidth increases, the method of stopping transmission of an SRS interfering with a PUCCH as shown in FIG. 4B is possible. Here, FIG. 4A is the same as FIG. 3A and shown to clarify the explanation in an overlapping manner. According to this method, bands in which SRSs are not transmitted are produced, and the accuracy of CQI estimation deteriorates in the frequency domain.

It is therefore an object of the present invention to provide a radio communication apparatus and a radio communication method that are able to reduce the deterioration of the accuracy of CQI estimation due to bands in which SRSs are not transmitted while preventing interference between SRSs and PUCCHs, in cases where the PUCCH transmission bandwidth varies in narrowband SRS transmission.

Means for Solving the Problem

The radio communication apparatus of the present invention adopts a configuration including: a generation section that generates a reference signal for measuring uplink data channel quality; a mapping section that frequency-multiplexes and maps the reference signal to a reference signal transmission band in which the reference signal is transmitted; and a control section that controls positions in which the frequency-multiplexing is performed such that the positions in which the frequency multiplexing is performed are placed evenly in a frequency domain without changing the bandwidth of one multiplexing unit of the reference signals according to a variation of a transmission bandwidth of the reference signals.

The radio communication method according to the present invention includes steps of: generating a reference signal for estimating uplink data channel quality; frequency-multiplexing and mapping the reference signal to a reference signal transmission band in which the reference signal is transmitted; and controlling positions in which the frequency-multiplexing is performed such that the positions in which the frequency-multiplexing is performed are placed evenly in a frequency domain without changing the bandwidth of one multiplexing unit of the reference signals according to a variation of a transmission bandwidth of the reference signals.

Advantageous Effects Of Invention

According to the present invention, it is possible to reduce the deterioration of the accuracy of CQI estimation due to bands in which SRSs are not transmitted while preventing interference between SRSs and PUCCHs in cases where the PUCCH transmission bandwidth varies in narrowband SRS transmission.

BRIEF DESCRIPTION OF DRAWINGS

FIG. 16 shows an example of the SRS allocation definition table according to the present embodiment;

BEST MODE FOR CARRYING OUT THE INVENTION

Now, embodiments of the present invention will be described in detail with reference to the accompanying drawings.

Embodiment 1

Figure 1:
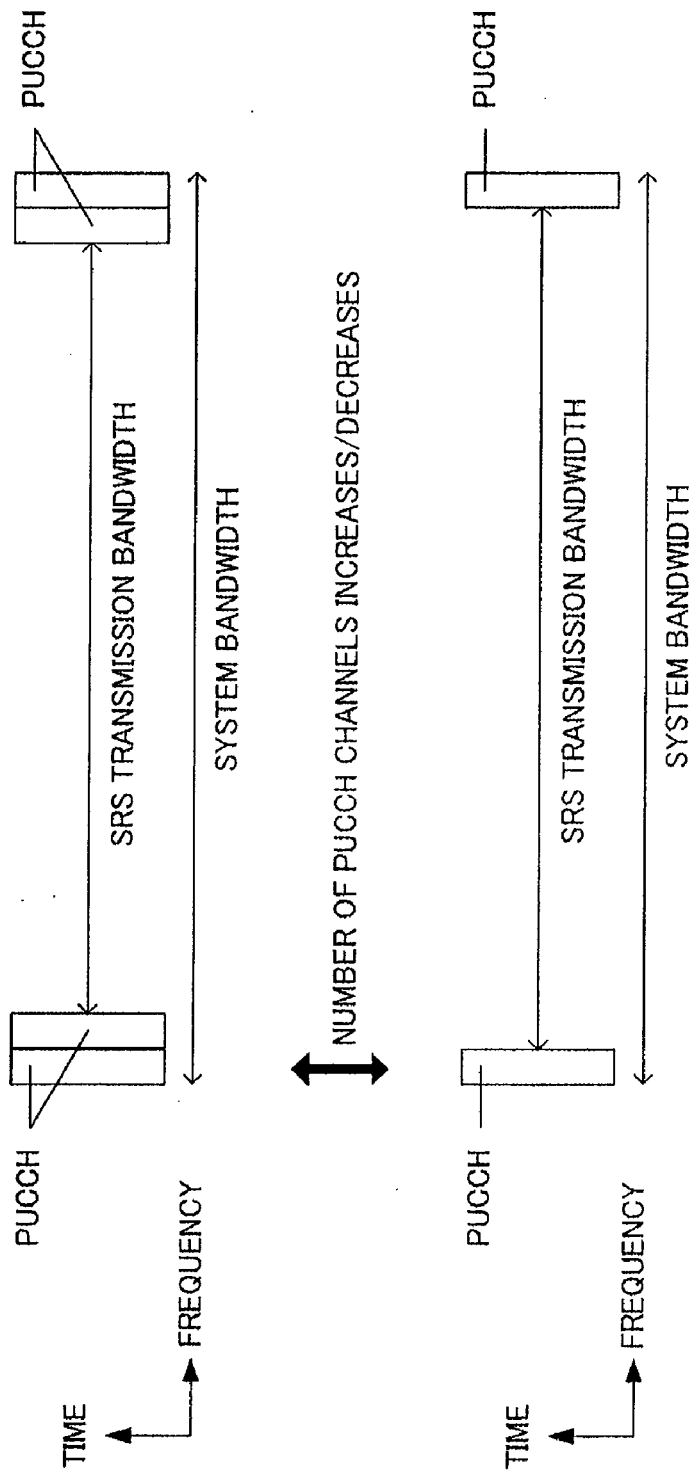
FIG. 1 shows a conventional case of how the SRS transmission bandwidth varies according to the variations of the PUCCH transmission bandwidth.
Figure 2:
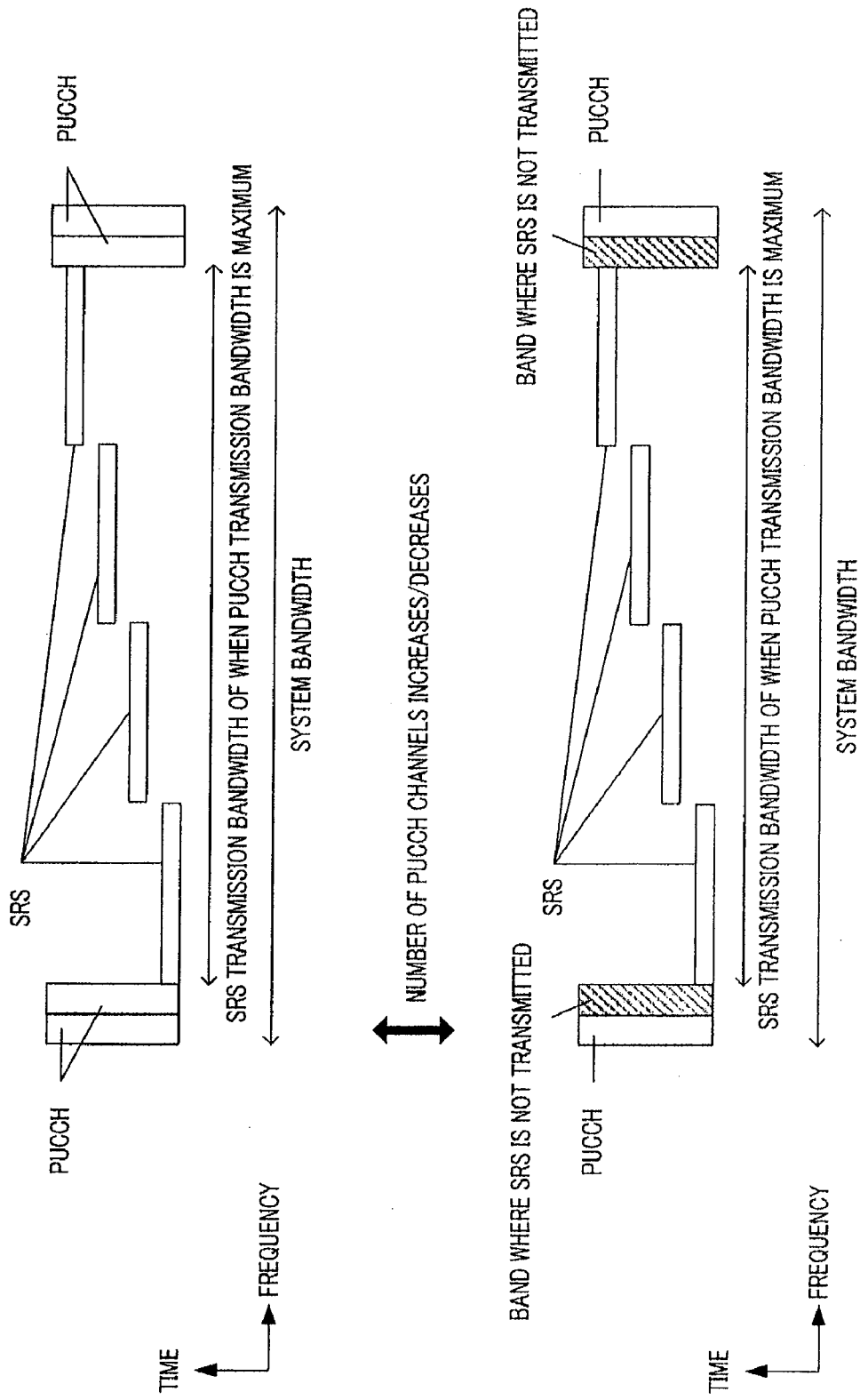
FIG. 2 shows a conventional narrowband SRS transmission method used when the PUCCH transmission bandwidth varies.
Figure 3A:
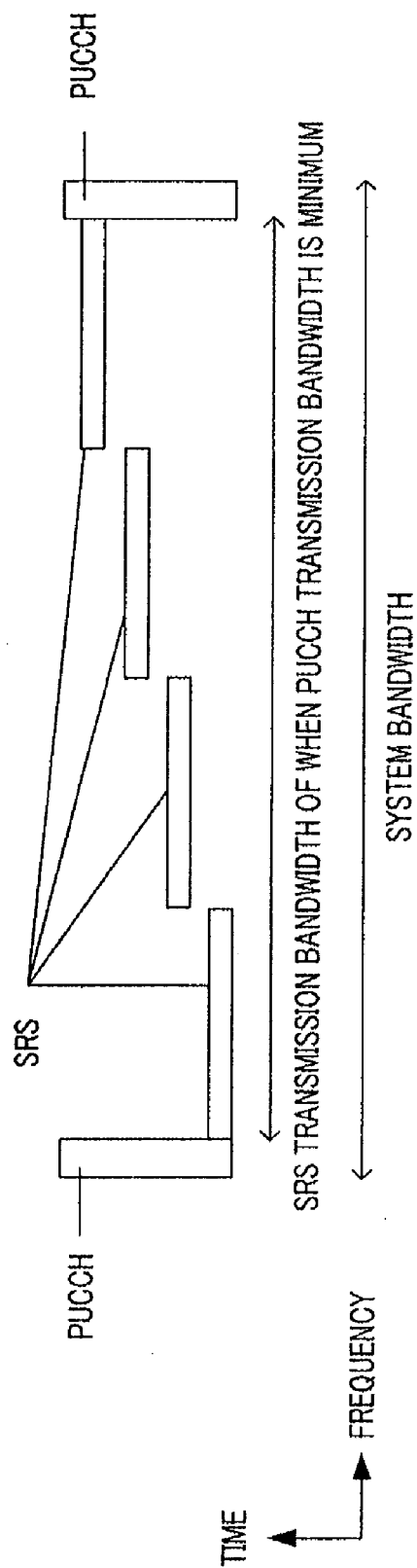
FIG. 3A shows an example of a conventional narrowband SRS transmission method used when the PUCCH transmission bandwidth varies.
Figure 3B:
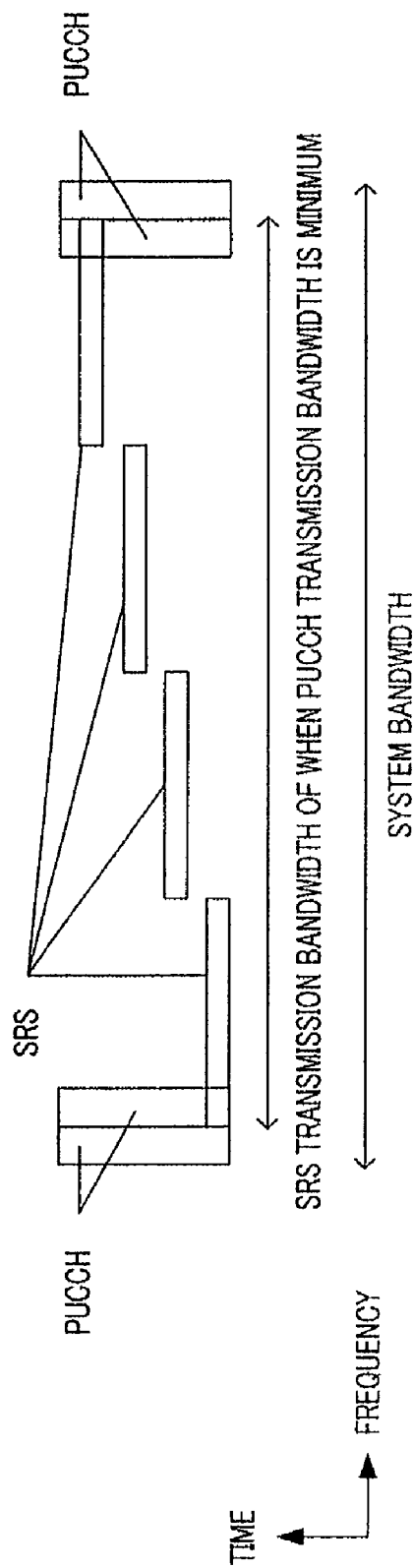
FIG. 3B shows an example of a conventional narrowband SRS transmission method used when the PUCCH transmission bandwidth varies.
Figure 4A:
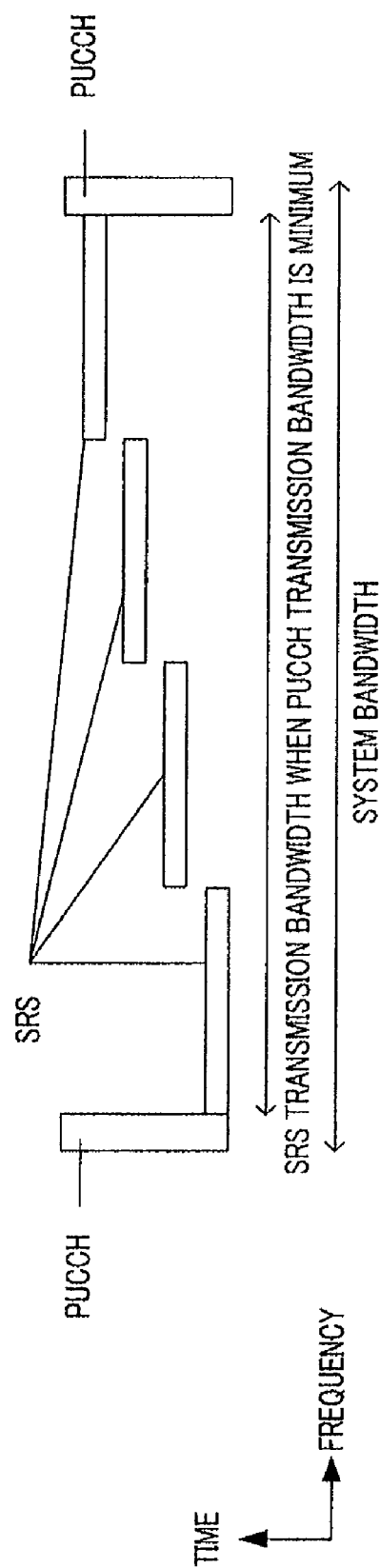
FIG. 4A shows an example of a conventional narrowband SRS transmission method used when the PUCCH transmission bandwidth varies.
Figure 4B:
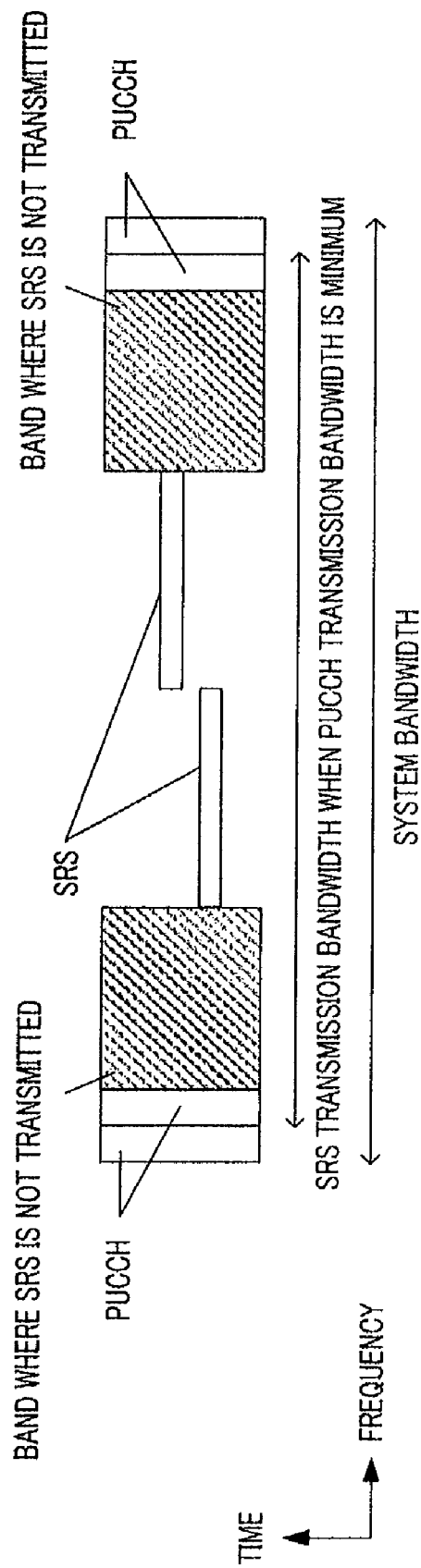
FIG. 4B shows an example of a conventional narrowband SRS transmission method used when the PUCCH transmission bandwidth varies.
Figure 5:
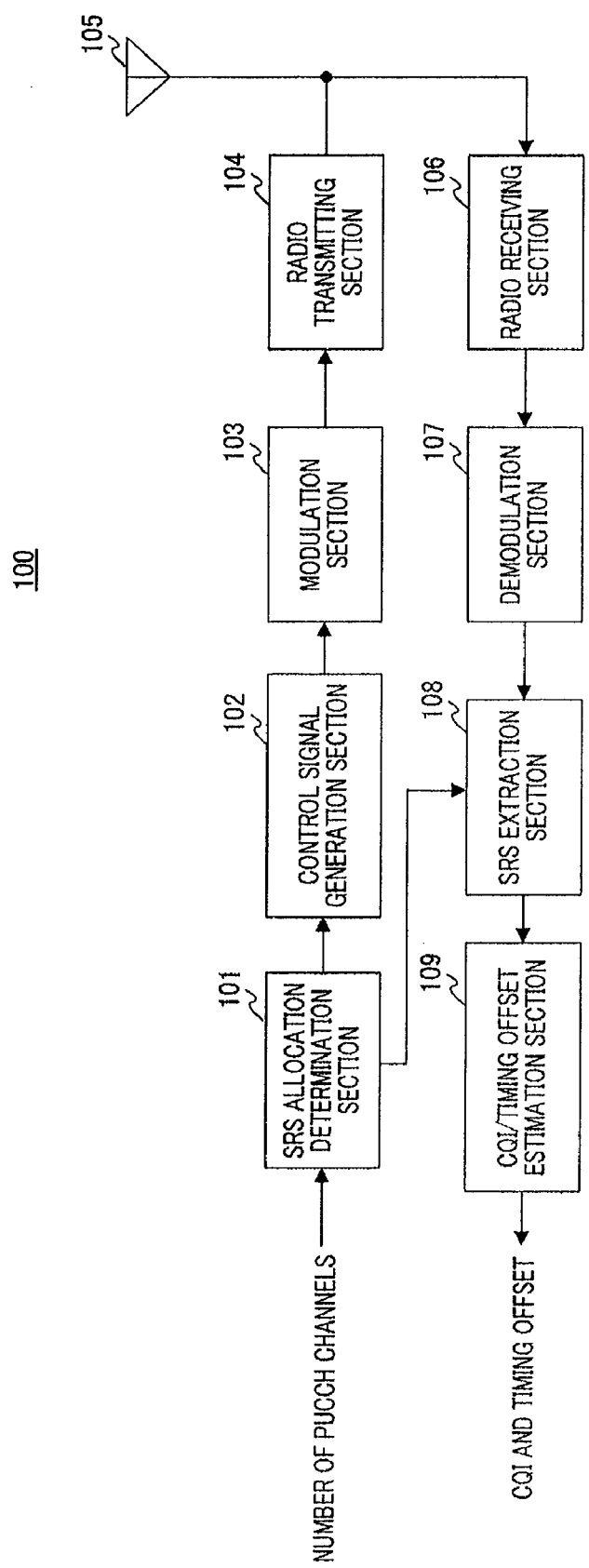
FIG. 5 is a block diagram showing the configuration of the base station according to Embodiment 1.
Figure 6:
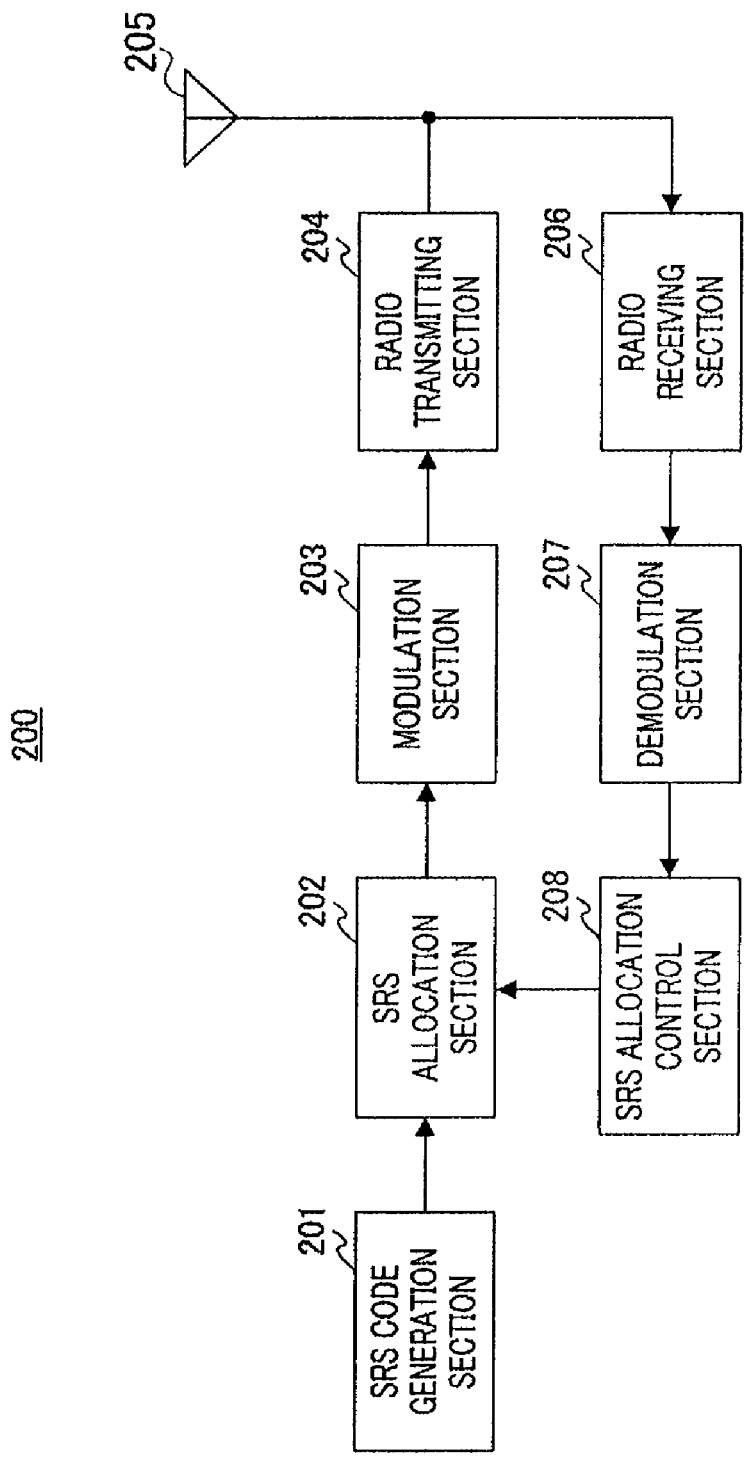
FIG. 6 is a block diagram showing the configuration of the mobile station according to Embodiment 1.

FIG. 5 shows the configuration of base station 100 according to Embodiment 1 of the present invention, and FIG. 6 shows the configuration of mobile station 200 according to Embodiment 1 of the present invention.

To avoid complicated explanation, FIG. 5 shows components involving SRS reception closely relating to the present invention, and drawings and explanations of the components involving uplink and downlink data transmission and reception are omitted. Likewise, FIG. 6 shows components involving SRS transmission closely relating to the present invention and, drawings and explanations of the components involving uplink and downlink data transmission and reception are omitted.

In base station 100 shown in FIG. 5, SRS allocation determination section 101 determines allocation of SRSs in the frequency domain and the time domain based on the number of PUCCH channels, and outputs information related to the determined SRS allocation (hereinafter "SRS allocation information"), to control signal generation section 102 and SRS extraction section 108. The processing in SRS allocation determination section 101 will be described later in detail. Control signal generation section 102 generates a control signal including SRS allocation information, and outputs the generated control signal to modulation section 103. Modulation section 103 modulates the control signal, and outputs the modulated control signal to radio transmitting section 104. Radio transmitting section 104 performs transmitting processing including D/A conversion, up-conversion and amplification, on the modulated signal, and transmits the resulting signal from antenna 105.

Radio receiving section 106 receives SRSs via radio from mobile station 200 via antenna 105, performs receiving processing including down-conversion and A/D conversion on the SRSs and outputs the SRSs after receiving processing to demodulation section 107. Demodulation section 107 demodulates the received SRSs and outputs the demodulated SRSs to SRS extraction section 108. SRS extraction section 108 extracts SRSs allocated in the frequency domain and the time domain based on the SRS allocation information received as input from SRS allocation determination section 101, and outputs the extracted SRSs to CQI/timing offset estimation section 109. CQI/timing offset estimation section 109 estimates CQIs and timing offset from the SRSs.

In mobile station 200 shown in FIG. 6, SRS code generation section 201 generates a code sequence used as an SRS for measuring uplink data channel quality, that is, generates an SRS code, and outputs the SRS code to SRS allocation section 202. SRS allocation section 202 maps the SRS code to resources in the time domain and frequency domain according to SRS allocation control section 208, and outputs the mapped SRS code to modulation section 203. Modulation section 203 modulates the SRS code and outputs the modulated SRS code to radio transmitting section 204. Radio transmitting section 204 performs transmitting processing including D/A conversion, up-conversion and amplification, on the modulated signal, and transmits the resulting signal from antenna 205.

Radio receiving section 206 receives a control signal via radio from base station 100 via antenna 205, performs receiving processing including down-conversion and A/D conversion on the control signal and outputs the control signal after receiving processing to demodulation section 207. Demodulation section 207 demodulates the received control signal and outputs the demodulated control signal to SRS allocation control section 208. SRS allocation control signal 208 controls SRS allocation section 202 according to the SRS allocation information included in the demodulated control signal.

Next, the processing in SRS allocation determination section 101 in base station 100 will be explained in detail.

Figure 7:
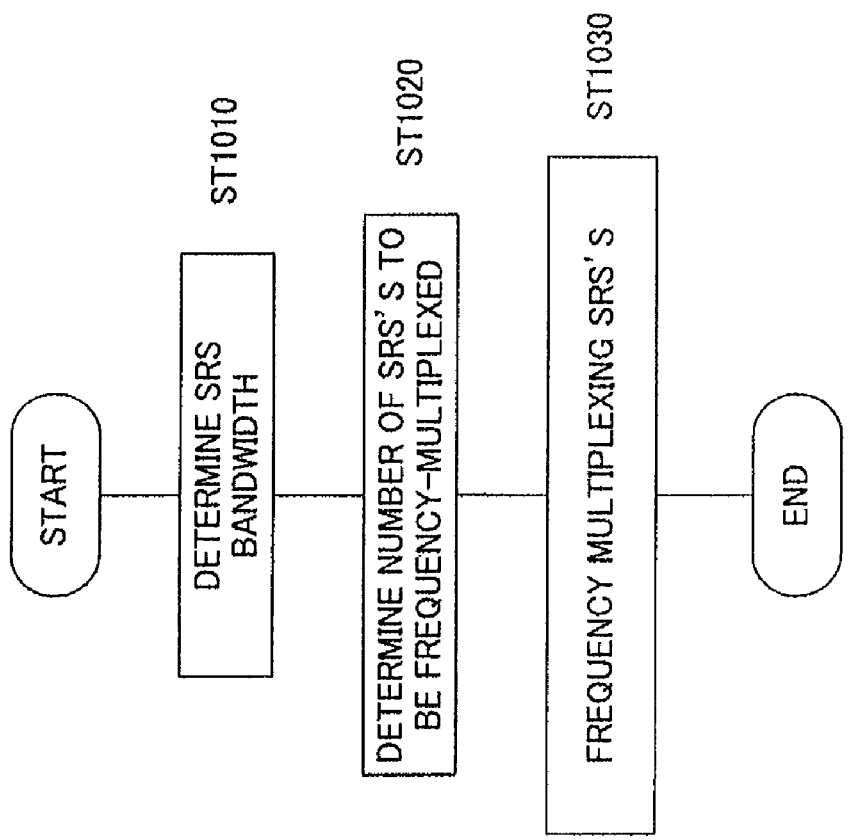
FIG. 7 is a flow chart showing the processing steps in the SRS allocation determination section according to Embodiment 1 of the present invention.

FIG. 7 is a flow chart showing the processing steps in SRS allocation determination section 101.

First, in step (hereinafter "ST") 1010, SRS allocation determination section 101 determines an SRS bandwidth based on the required accuracy of CQI estimation and the required accuracy of timing offset estimation.

Next, in ST 1020, SRS allocation determination section 101 calculates the number of SRSs to be multiplexed in the frequency domain based on the system bandwidth, the number of PUCCH channels and the SRS bandwidth. To be more specific, the number of SRSs to be multiplexed in the frequency domain is the maximum number of SRSs which can be multiplexed on the SRS transmission bandwidth obtained by subtracting the PUCCH transmission bandwidth from the system bandwidth, and which each have a bandwidth of one transmission unit determined in ST 1010. That is, the number of SRSs to be multiplexed in the frequency domain is the integer part of the quotient obtained by dividing the SRS transmission bandwidth by the SRS bandwidth determined in ST 1010. Here, the PUCCH transmission bandwidth is determined by the number of PUCCH channels, and varies according to the number of items of control data to be accommodated.

Next, in ST 1030, SRS allocation determination section 101 first determines allocation of SRSs such that the SRSs are frequency-hopped (frequency-multiplexed) in the SRS transmission bandwidth at predetermined time intervals. To be more specific, SRS allocation determination section 101 determines that SRSs are mapped in the frequency domain and time domain such that the SRSs cover the frequency band to be subject to CQI estimation evenly and are mapped at predetermined time intervals in the time domain.

Figure 8A:
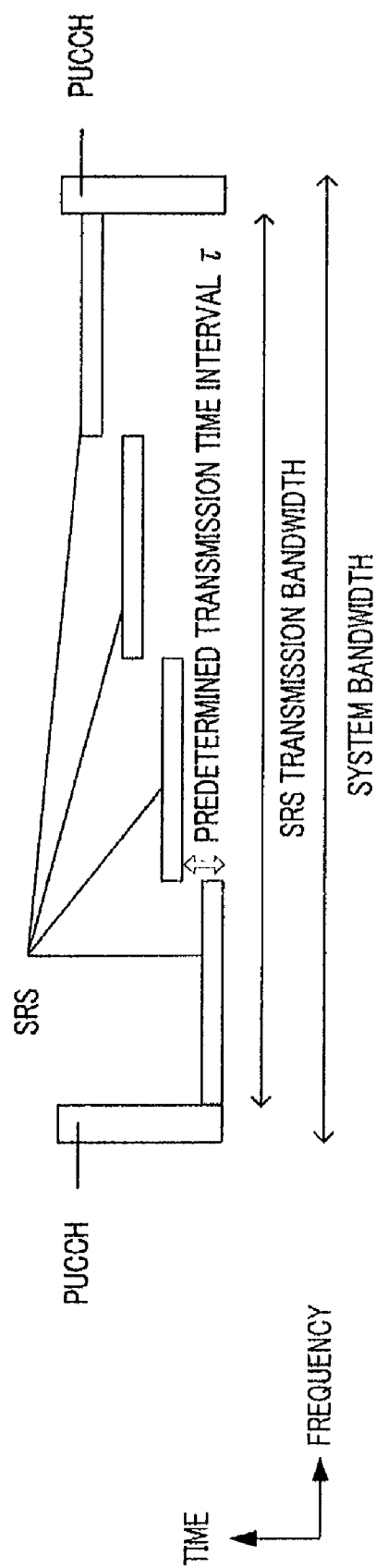
FIG. 8A shows an allocation example of SRSs determined in the SRS allocation determination section according to Embodiment 1 of the present invention.
Figure 8B:
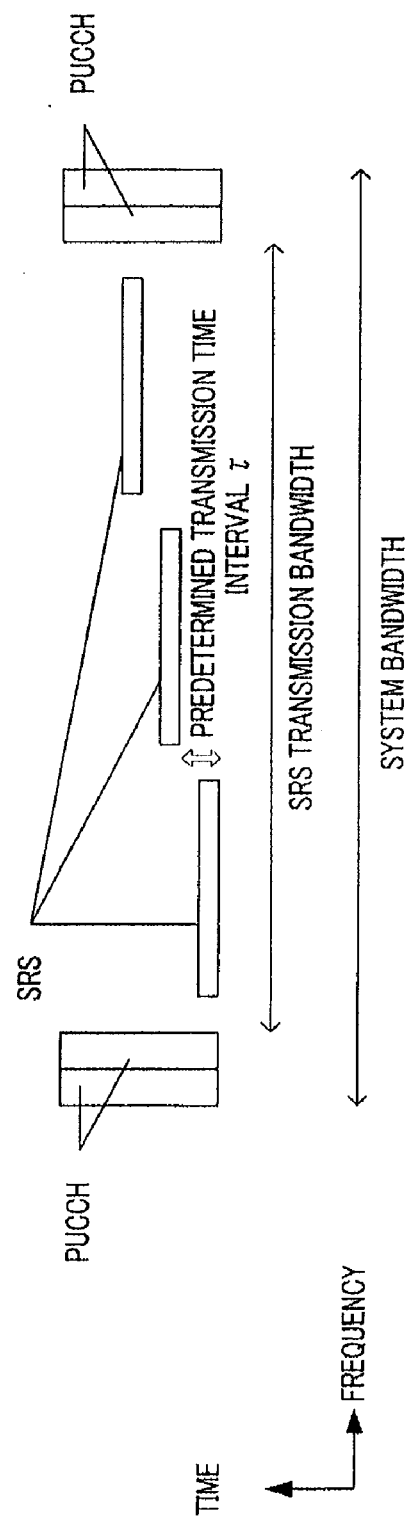
FIG. 8B shows an allocation example of SRSs determined in the SRS allocation determination section according to Embodiment 1 of the present invention.

FIGS. 8A and 8B show examples of SRS allocation determined in SRS allocation determination section 101. FIG. 8A shows a case where the number of PUCCH channels is two, and FIG. 8B shows a case where the number of PUCCH channels is four.

In FIGS. 8A and 8B, the SRS bandwidths are determined so as to fulfill the required accuracy of CQI estimation and the required accuracy of timing offset, and are not changed even when the number of PUCCH channels and SRS transmission bandwidth vary.

Further, the number of PUCCH channels varies between FIGS. 8A and 8B, and therefore, the SRS transmission bandwidth varies and the number of SRSs to be frequency-multiplexed, that is, the number of SRS hopping, obtained by dividing the SRS transmission bandwidth by the SRS bandwidths determined in ST 1010, varies. When the number of PUCCH channels is two in FIG. 8A, the number of SRSs to be frequency-multiplexed is four, and, when the number of PUCCH channels is four in FIG. 8B, the number of SRSs to be frequency-multiplexed is three.

Then, as shown in FIG. 8, the positions where SRSs are frequency-multiplexed in the SRS transmission bandwidth are positions to cover the SRS transmission band evenly, that is, the frequency band subject to CQI estimation. This results in dividing the band in which SRSs are not transmitted into a number of bands having smaller bandwidths, that is, this prevents SRSs from being not transmitted over a specific wide range of a band, so that it is possible to reduce the deterioration of the accuracy of CQI estimation due to bands in which SRSs are not transmitted.

In this way, according to the present embodiment, in accordance with an increase and decrease of the number of PUCCH channels, SRS allocation is changed to cover a CQI estimation bandwidth with fixed SRS bandwidths evenly, so that, when the PUCCH transmission bandwidth varies, it is possible to prevent interference between SRSs and PUCCHs while maintaining the accuracy of CQI estimation and the accuracy of timing offset estimation, and reduce the deterioration of the accuracy of CQI estimation due to bands in which SRSs are not transmitted.

Embodiment 2

The base station and the mobile station according to Embodiment 2 of the present invention adopt the same configurations and basically perform the same operations as the base station and the mobile station according to Embodiment 1. Therefore, block diagrams are not shown here, and the description will be omitted in detail. The base station and the mobile station according to the present embodiment are different from the base station and the mobile station according to Embodiment 1 only in the SRS allocation determination section in the base station. The SRS allocation determination section provided in the base station according to the present embodiment is different from SRS allocation determination section 101 provided in the base station according to Embodiment 1 only in part of processing.

Now, the processing in the SRS allocation determination section according to the present embodiment will be explained.

Figure 9:
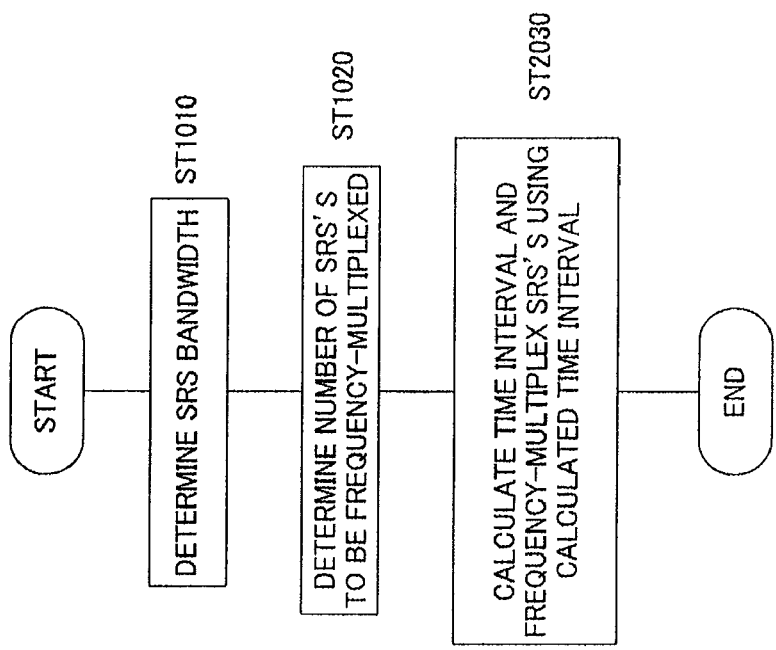
FIG. 9 is a flow chart showing the processing steps in the SRS allocation determination section according to Embodiment 2 of the present invention.

FIG. 9 is a flow chart showing the processing steps in the SRS allocation determination section according to the present embodiment. The steps shown in FIG. 9 are basically the same as shown in FIG. 7 and the same reference numerals are assigned to the same steps, and therefore the explanation thereof will be omitted. The steps shown in FIG. 9 are different from the steps shown in FIG. 7 in only having ST 2030 instead of ST 1030.

In ST 2030, the SRS allocation determination section first calculates the time interval at which SRSs are mapped in the frequency domain and time domain according to the following equation 1. If the SRSs are transmitted using time interval $\tau(c_{PUCCH})$ calculated according to equation 1, the CQI estimation period in the CQI estimation target band is fixed even if the number of PUCCH channels varies.

[1]

$$\tau(c_{PUCCH}) \approx T/n(c_{PUCCH}) \qquad \text{(Equation 1)}$$

In equation 1, T represents the CQI estimation period in the CQI estimation target band and $c_{PUCCH}$ represents the number of PUCCH channels. $n(c_{PUCCH})$ represents the number of SRSs to be frequency-multiplexed, that is, the number of frequency hopping, when the number of PUCCH channels is $c_{PUCCH}$. The transmission interval is based on a time slot unit, and therefore $\tau(c_{PUCCH})$ is a result of the value on the right hand side of equation 1 matched with a time slot.

Further, in ST 2030, the SRS allocation determination section determines allocation of SRSs such that SRSs are frequency-multiplexed in the SRS transmission bandwidth at the calculated time interval τ. To be more specific, SRS allocation determination section determines to map SRSs so as to cover the frequency band subject to CQI estimation target evenly in the frequency domain and to cover CQI estimation period T evenly in the time domain.

Figure 10A:
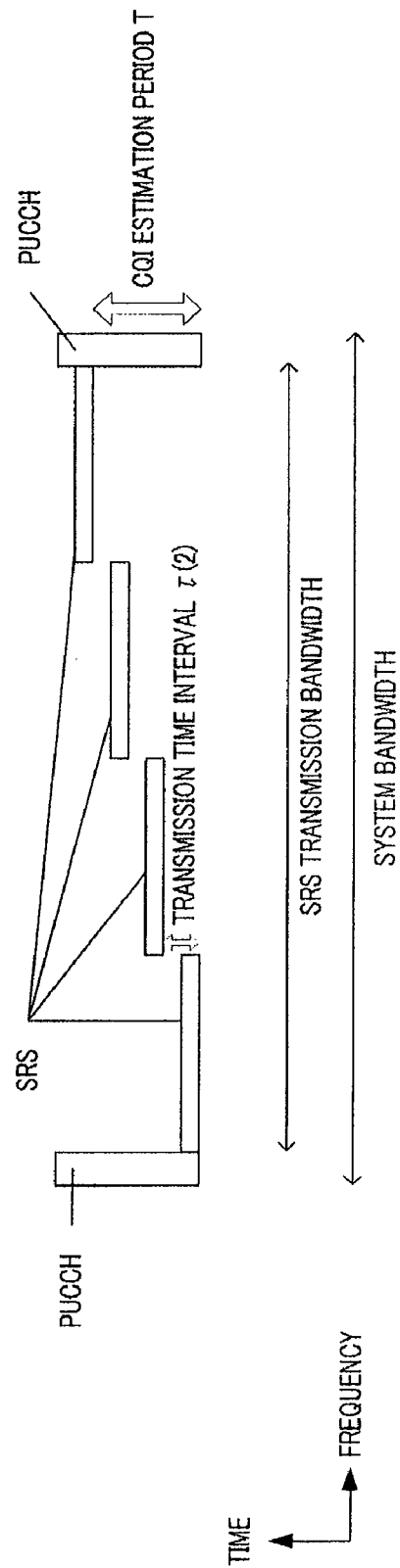
FIG. 10A shows an allocation example of SRSs determined in the SRS allocation determination section according to Embodiment 2 of the present invention.
Figure 10B:
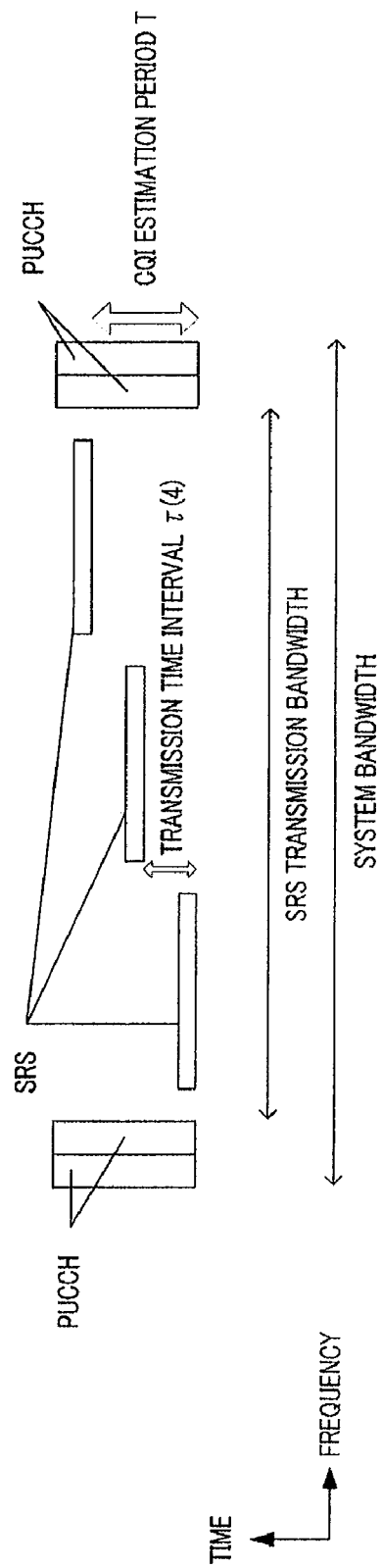
FIG. 10B shows an allocation example of SRSs determined in the SRS allocation determination section according to Embodiment 2 of the present invention.

FIGS. 10A and 10B show examples of SRS allocation determined in the SRS allocation determination section according to the present embodiment. FIG. 10 is basically the same as FIG. 8 and the overlapping explanation will be omitted.

In FIGS. 10A and 10B, the SRS bands are not changed in accordance with a variation of SRS transmission bandwidth, and SRSs are frequency-multiplexed so as to cover the SRS transmission bandwidth evenly.

Further, in FIG. 10A, SRSs are mapped using time interval τ(2), and in FIG. 10B, SRSs are mapped using time interval τ(4). That is, in the present embodiment, when the number of PUCCH channels decreases, the SRS transmission interval is made shorter and when the number of PUCCH channels increases, the SRS transmission interval is made longer. By this means, even when the number of PUCCH channels varies, CQI estimation period T does not vary.

In this way, according to the present embodiment, in accordance with an increase and decrease of the number of PUCCH channels, SRS allocation is changed such that a CQI estimation bandwidth is covered with fixing SRS bandwidths evenly. Accordingly, when the PUCCH transmission bandwidth varies, it is possible to prevent SRSs and PUCCHs from interfering each other while maintaining the accuracy of CQI estimation and the accuracy of timing offset, and reduce the deterioration of the accuracy of CQI estimation due to bands in which SRSs are not transmitted.

Further, according to the present embodiment, when the number of PUCCH channels decreases, the SRS transmission interval is made shorter and when the number of PUCCH channels increases, the SRS transmission interval is made longer. By this means, when the PUCCH transmission bandwidth varies, it is possible to maintain a constant CQI estimation period and prevent the accuracy of CQI estimation from deteriorating.

Embodiment 3

The base station and the mobile station according to Embodiment 3 of the present invention adopt the same configurations and basically perform the same operations as the base station and the mobile station according to Embodiment 1. Therefore, block diagrams are not shown here, and the description will be omitted in detail. The base station and the mobile station according to the present embodiment are different from the base station and the mobile station according to Embodiment 1 only in the SRS allocation determination section in the base station. The SRS allocation determination section provided in the base station according to the present embodiment is different from SRS allocation determination section 101 provided in the base station according to Embodiment 1 only in part of processing.

Now, the allocation of SRSs determined in the SRS allocation determination section according to the present embodiment will be explained.

Figure 11A:
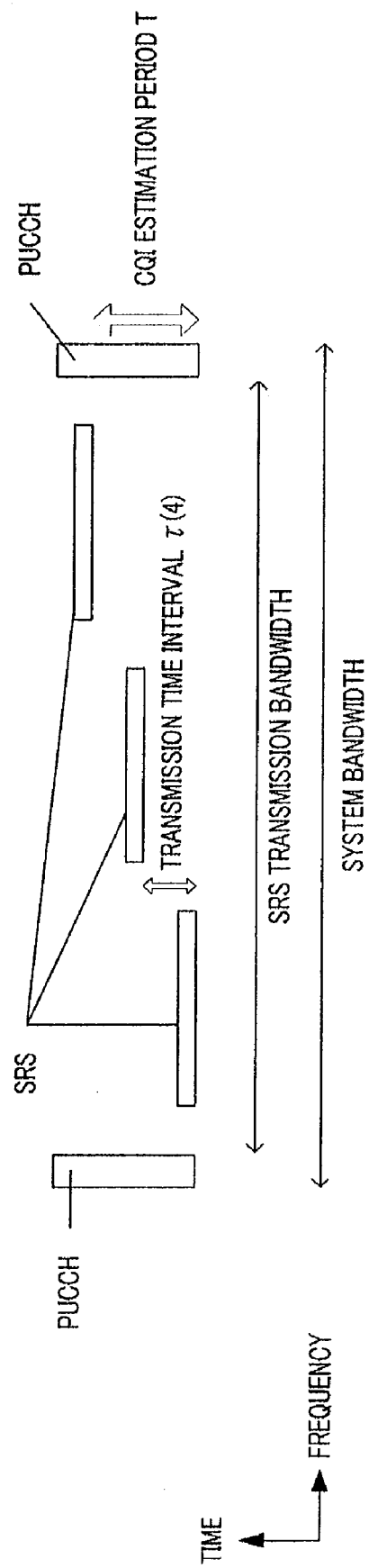
FIG. 11A shows an allocation example of SRSs determined in the SRS allocation determination section according to Embodiment 3 of the present invention.
Figure 11B:
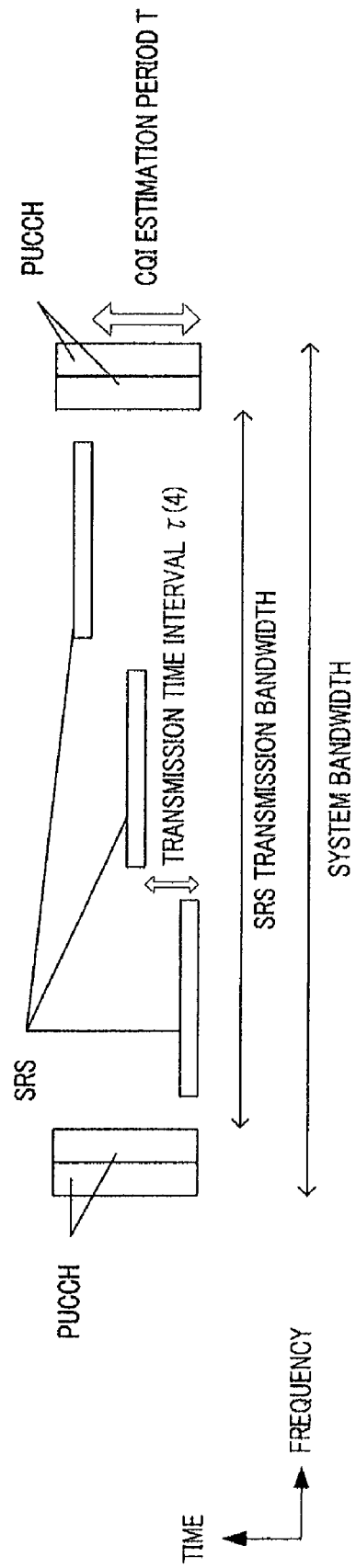
FIG. 11B shows an allocation example of SRSs determined in the SRS allocation determination section according to Embodiment 3 of the present invention.

FIGS. 11A and 11B show examples of SRS allocation determined in the SRS allocation determination section according to the present embodiment. FIG. 11 is basically the same as FIG. 10 and the overlapping explanation will be omitted.

In FIGS. 11A and 11B, the SRS bands are not changed in accordance with a variation of SRS transmission bandwidth, and SRSs are frequency-multiplexed so as to cover the SRS transmission bandwidth evenly.

Further, as shown in FIGS. 11A and 11B, the number of SRSs to be frequency-multiplexed is the number of when the number of PUCCH channels is the maximum, regardless of whether the number of PUCCHs increases or decreases. Here, the maximum value for the number of PUCCH channels is four and the number of SRSs to be frequency-multiplexed is three.

Further, as shown in FIGS. 11A and 11B, a transmission interval between SRSs is the transmission interval of when the number of PUCCH channels is the maximum, regardless of whether the number of PUCCHs increases or decreases. Here, the maximum value for the number of PUCCH channels is four and the transmission interval is represented by τ(4). According to the method as shown in FIG. 11, it is not necessary to calculate a transmission interval every time the number of PUCCH channels varies and it is possible to simplify the determination processing of SRS allocation.

In this way, according to the present embodiment, in accordance with an increase and decrease of the number of PUCCH channels, SRS allocation is changed such that a CQI estimation bandwidth is evenly covered with fixing SRS bandwidths. By this means, when the PUCCH transmission bandwidth varies, it is possible to prevent SRSs and PUCCHs from interfering each other while maintaining the accuracy of CQI estimation and the accuracy of timing offset, and reduce the deterioration of the accuracy of CQI estimation due to bands in which SRSs are not transmitted.

Furthermore, according to the present embodiment, in accordance with an increase and decrease of the number of PUCCH channels, SRSs are mapped without changing the number of SRSs to be frequency-multiplexed and the SRS transmission interval, so that it is possible to simplify the SRS allocation process.

Embodiment 4

In Embodiment 4 of the present invention, the method of SRS allocation from a plurality of mobile stations in accordance with a variation of the PUCCH transmission bandwidth, will be explained.

The base station and the mobile station according to Embodiment 4 of the present invention adopt the same configurations and basically perform the same operations as the base station and the mobile station according to Embodiment 1. Therefore, block diagrams are not shown here, and the description will be omitted in detail. The base station and the mobile station according to the present embodiment are different from the base station and the mobile station according to Embodiment 1 in only the SRS allocation determination section in the base station. The SRS allocation determination section provided in the base station according to the present embodiment is different from SRS allocation determination section 101 provided in the base station according to Embodiment 1 only in part of processing.

Now, the allocation of SRSs determined in the SRS allocation determination section according to the present embodiment will be explained.

Figure 12A:
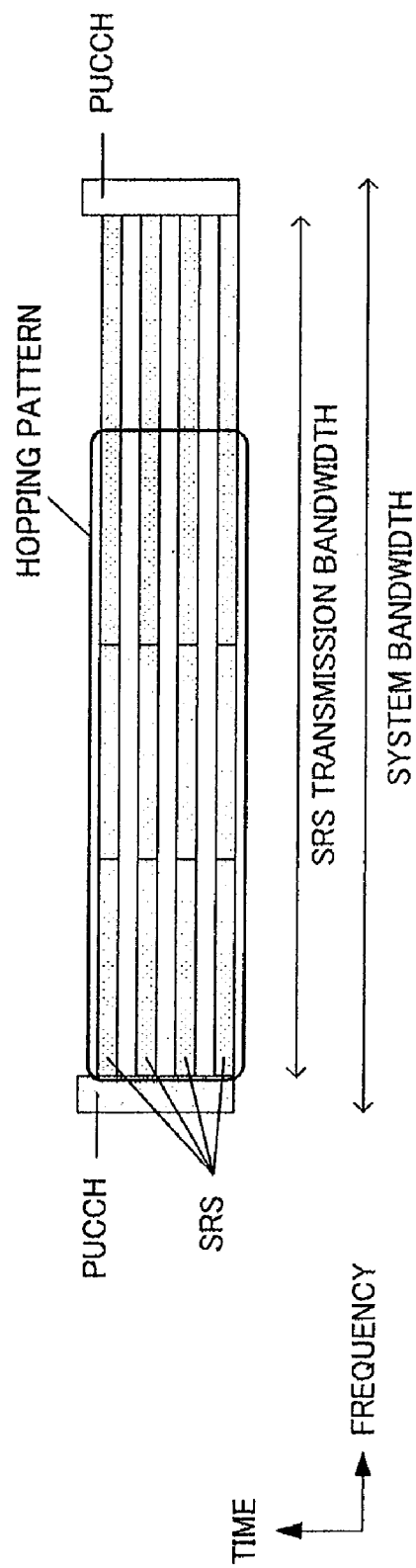
FIG. 12A shows an allocation example of SRSs determined in the SRS allocation determination section according to Embodiment 4 of the present invention.
Figure 12B:
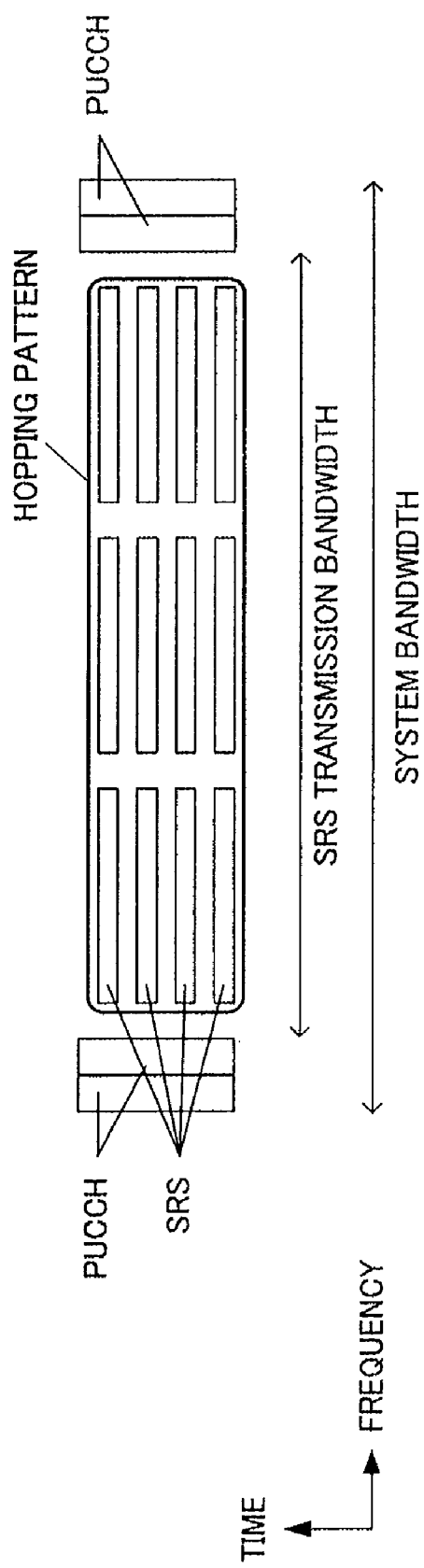
FIG. 12B shows an allocation example of SRSs determined in the SRS allocation determination section according to Embodiment 4 of the present invention.

FIGS. 12A and 12B show examples of SRS allocation determined in the SRS allocation determination section according to the present embodiment. FIG. 12 is basically the same as FIG. 8 and the overlapping explanation will be omitted.

In FIGS. 12A and 12B, the SRS bands are not changed in accordance with a variation of SRS transmission bandwidth, and SRSs are frequency-multiplexed so as to cover the SRS transmission bandwidth evenly.

Further, as shown in FIGS. 12A and 12B, in accordance with the variation of the PUCCH transmission bandwidth, the SRS allocation determination section according to the present embodiment maps SRSs without changing the hopping pattern of SRSs in a predetermined frequency band. In other words, SRS allocation to be changed is controlled so as to make different hopping patterns in the same band. To be more specific, by transmitting and not transmitting SRSs mapped to the specific band according to an increase and decrease of the PUCCH transmission bandwidth, it is not necessary to change the hopping pattern in other bands.

In this way, according to the present embodiment, in accordance with an increase and decrease of the number of PUCCH channels, SRS allocation is changed such that a CQI estimation bandwidth is evenly covered with fixing SRS bandwidths. By this means, when the PUCCH transmission bandwidth varies, it is possible to prevent SRSs and PUCCHs from interfering each other while maintaining the accuracy of CQI estimation and the accuracy of timing offset, and reduce the decrease of the accuracy of CQI estimation due to bands in which SRSs are not transmitted.

Further, according to the present embodiment, in accordance with an increase and decrease of the number of PUCCH channels, SRSs are mapped in the frequency domain and time domain without changing the SRS hopping pattern, so that, when the PUCCH transmission bandwidth varies, it is possible to maintain the number of SRSs from mobile stations to be multiplexed and the CQI estimation period in the CQI estimation target band of each mobile station.

Embodiment 5

The base station and the mobile station according to Embodiment 5 of the present invention adopt the same configurations and basically perform the same operations as the base station and the mobile station according to Embodiment 1. Therefore, block diagrams are not shown here, and the description will be omitted in detail. The base station and the mobile station according to the present embodiment are different from the base station and the mobile station according to Embodiment 1 only in the SRS allocation determination section in the base station. The SRS allocation determination section provided in the base station according to the present embodiment is different from SRS allocation determination section 101 provided in the base station according to Embodiment 1 only in part of processing.

Now, the allocation of SRSs determined in the SRS allocation determination section according to the present embodiment will be explained.

Figure 13A:
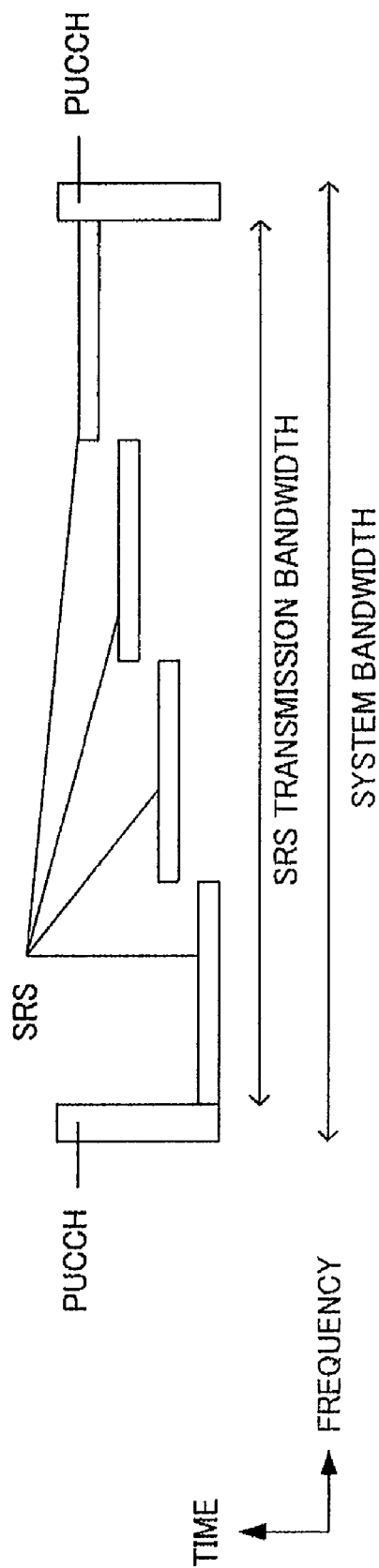
FIG. 13A shows an allocation example of SRSs determined in the SRS allocation determination section according to Embodiment 5 of the present invention.
Figure 13B:
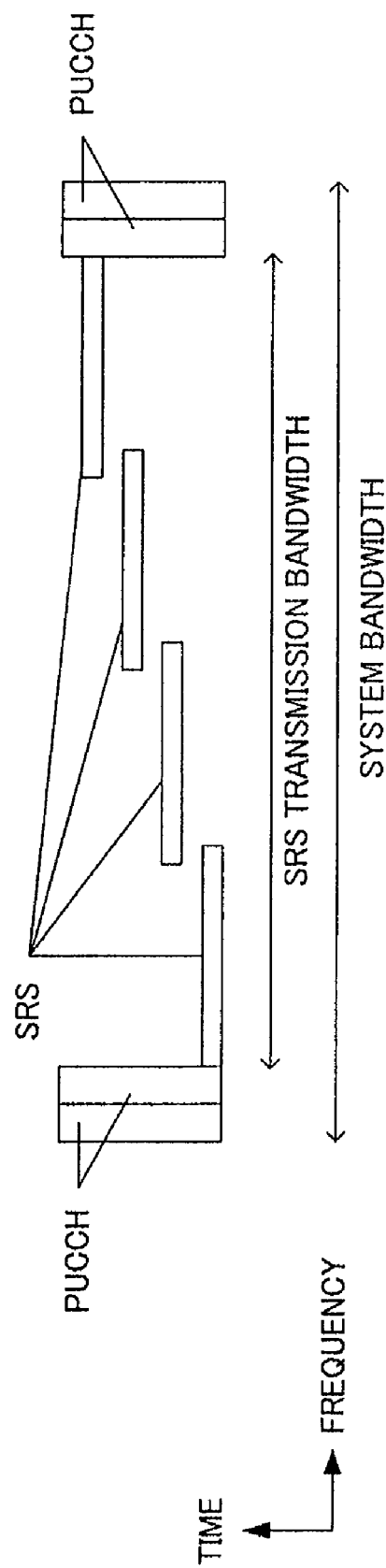
FIG. 13B shows an allocation example of SRSs determined in the SRS allocation determination section according to Embodiment 5 of the present invention.

FIGS. 13A and 13B show examples of SRS allocation determined in the SRS allocation determination section according to the present embodiment.

In FIGS. 13A and 13B, the SRS bands are not changed in accordance with a variation of SRS transmission bandwidth, and SRSs are frequency-multiplexed so as to cover the SRS transmission bandwidth evenly.

Further, in FIGS. 13A and 13B, the number of SRSs to be frequency-multiplexed is the number of when the number of PUCCH channels is the minimum and is fixed regardless of whether the number of PUCCHs increases or decreases. In FIGS. 13A and 13B, the minimum value for the number of PUCCH channels is two and the number of SRSs to be frequency-multiplexed is four.

Further, in FIGS. 13A and 13B, while the SRS transmission bandwidth varies in accordance with an increase and decrease of the number of PUCCH channels, the number of SRSs to be frequency-multiplexed is fixed, and therefore SRSs are mapped in the frequency domain such that a plurality of SRSs partly overlap.

Further, in FIGS. 13A and 13B, the number of SRSs to be frequency-multiplexed does not change in accordance with an increase and decrease of the number of PUCCH channels, and therefore SRS transmission intervals do not change.

In this way, according to the present embodiment, in accordance with an increase and decrease of the number of PUCCH channels, SRS allocation is changed such that a CQI estimation bandwidth is covered with fixing SRS bandwidths evenly. Accordingly, when the PUCCH transmission bandwidth varies, it is possible to prevent interference between an SRS and a PUCCH while maintaining the accuracy of CQI estimation and the accuracy of timing offset, and reduce the deterioration of the accuracy of CQI estimation due to bands in which SRSs are not transmitted.

Further, according to the present embodiment, in accordance with an increase and decrease of the number of PUCCH channels, SRS are mapped such that bands of frequency-multiplexed SRSs partly overlap, without changing the number of SRSs to be frequency-multiplexed, so that it is possible to improve the accuracy of CQI estimation more and prevent the accuracy of CQI estimation from deteriorating due to bands in which SRSs are not transmitted.

The embodiments of the present invention have been explained.

Although cases have been explained with the above embodiments where the number of PUCCH channels is two or four, the number is explained with examples only and the present invention is not limited to this.

Further, although cases have been explained with the above embodiments where the SRS transmission bandwidth is the band obtained by subtracting the PUCCH transmission bandwidth from the system bandwidth, the present invention is not limited to this, and the SRS transmission bandwidth may be a specific band varying according to an increase and decrease of the number of PUCCH channels.

Figure 14A:
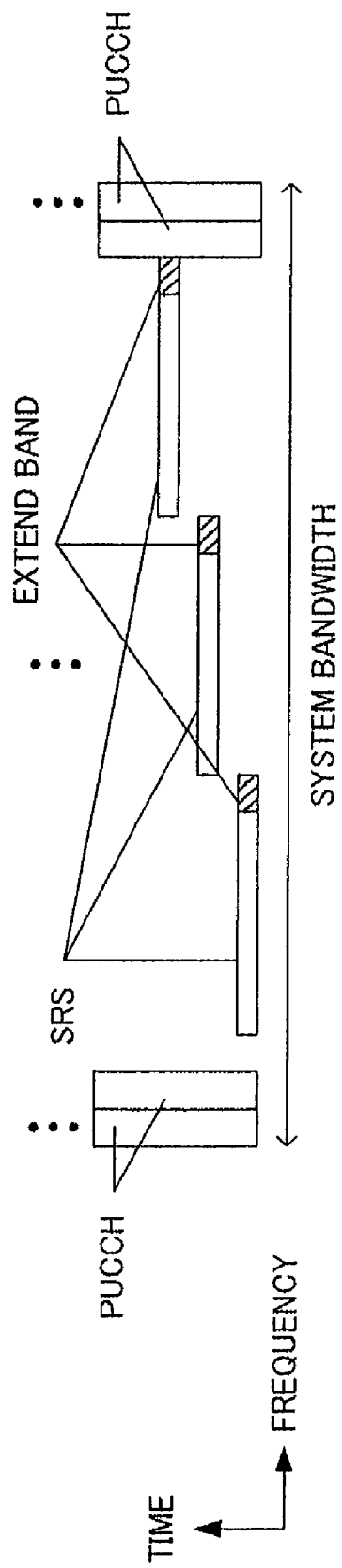
FIG. 14A shows an allocation example (example 1) of SRSs determined in an example of the SRS allocation determination section according to the present invention.

Further, although cases have been explained with the above embodiments as examples where the SRS bands are not changed in accordance with an increase and decrease of the number of PUCCH channels and the positions on which SRSs are frequency-multiplexed in the SRS transmission band change, the present invention is not limited to this, and it is possible to change the positions where SRSs are frequency-multiplexed in the SRS transmission band according to an increase and decrease of the number of PUCCH channels, and change the SRS bandwidths. A variation of an SRS bandwidth is needed to be limited within a range in which the deterioration of the accuracy of CQI estimation and the accuracy of timing offset can be ignored, for example within ±1 to 2 RBs, and this limitation makes it possible to reduce the deterioration of the accuracy of CQI estimation. Here, an RB (Resource Block) refers to a unit representing a specific range of radio resources. FIG. 14A shows an example where the SRS bands extend in a predetermined range and the range of each extended band in FIG. 14A is 1 RB or less. Further, to extend and contract the SRS transmission band here, CAZAC (Constant Amplitude Zero Auto-Correlation) sequence or cyclic extension and truncation of a sequence having the same characteristics as CAZAC may be adopted.

Figure 14B:
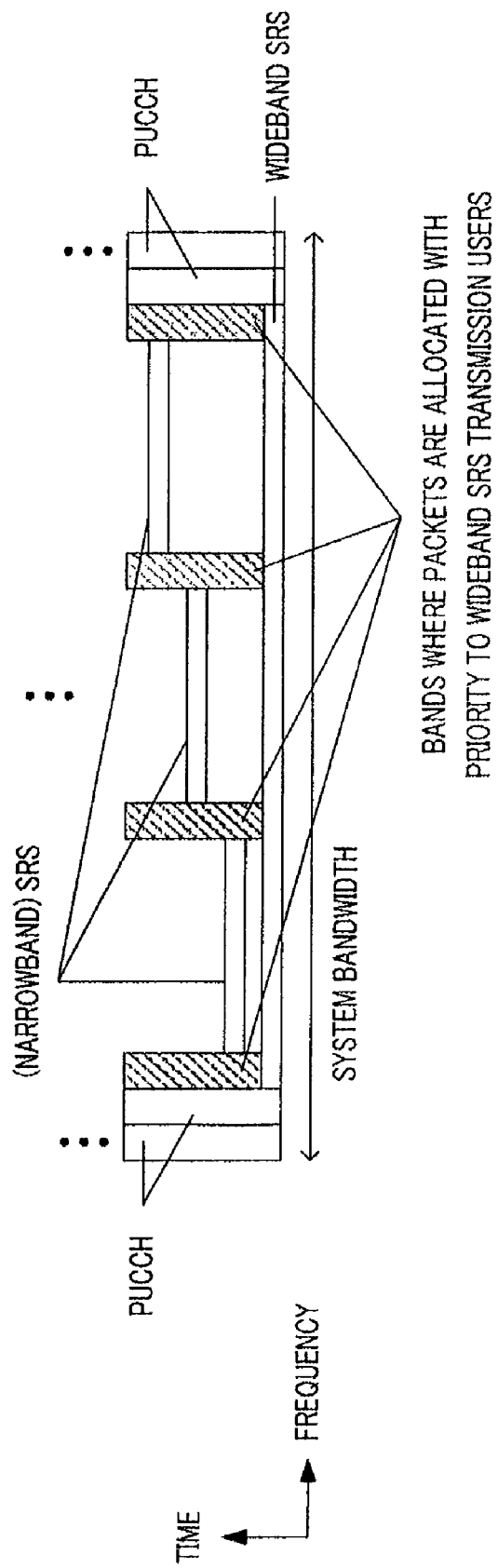
FIG. 14B shows an allocation example (example 1) of SRSs determined in an example of the SRS allocation determination section according to the present invention.

Further, it is possible to allocate uplink data channels for which CQIs cannot be estimated using narrowband SRSs with the above embodiments, to mobile stations transmitting wideband SRSs with priority. FIG. 14B illustrates to explain a case where uplink data channels for which CQIs cannot be estimated using narrowband SRSs are allocated with priority to mobile stations transmitting wideband SRSs. The above packet allocation method makes it possible to prevent the frequency scheduling effect from lowering.

Figure 15A:
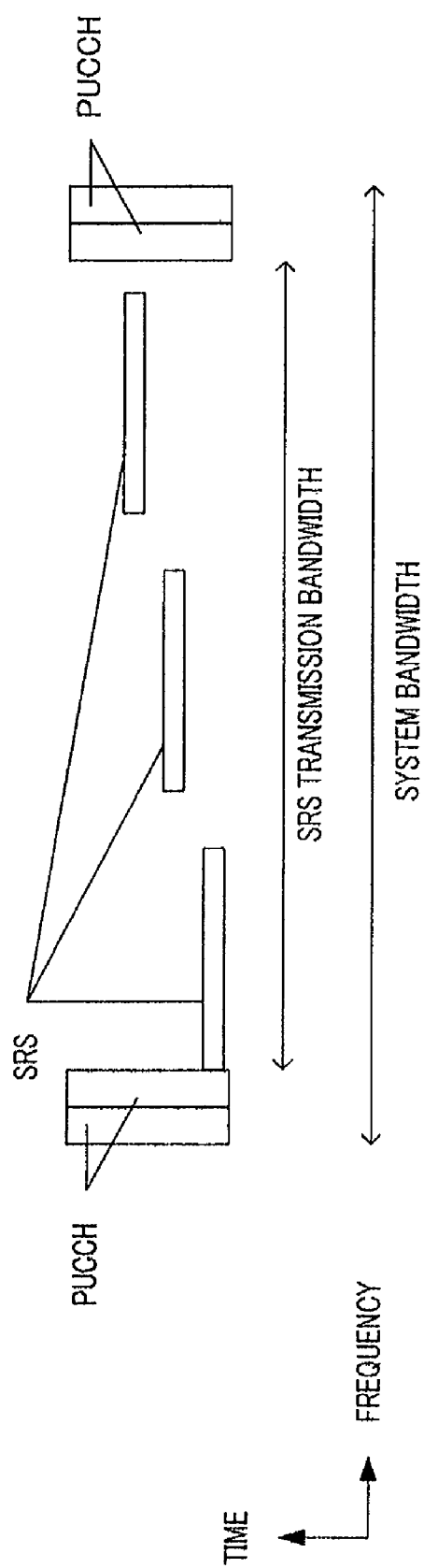
FIG. 15A shows an allocation example (example 2) of SRSs determined in an example of the SRS allocation determination section according to the present invention.
Figure 15B:
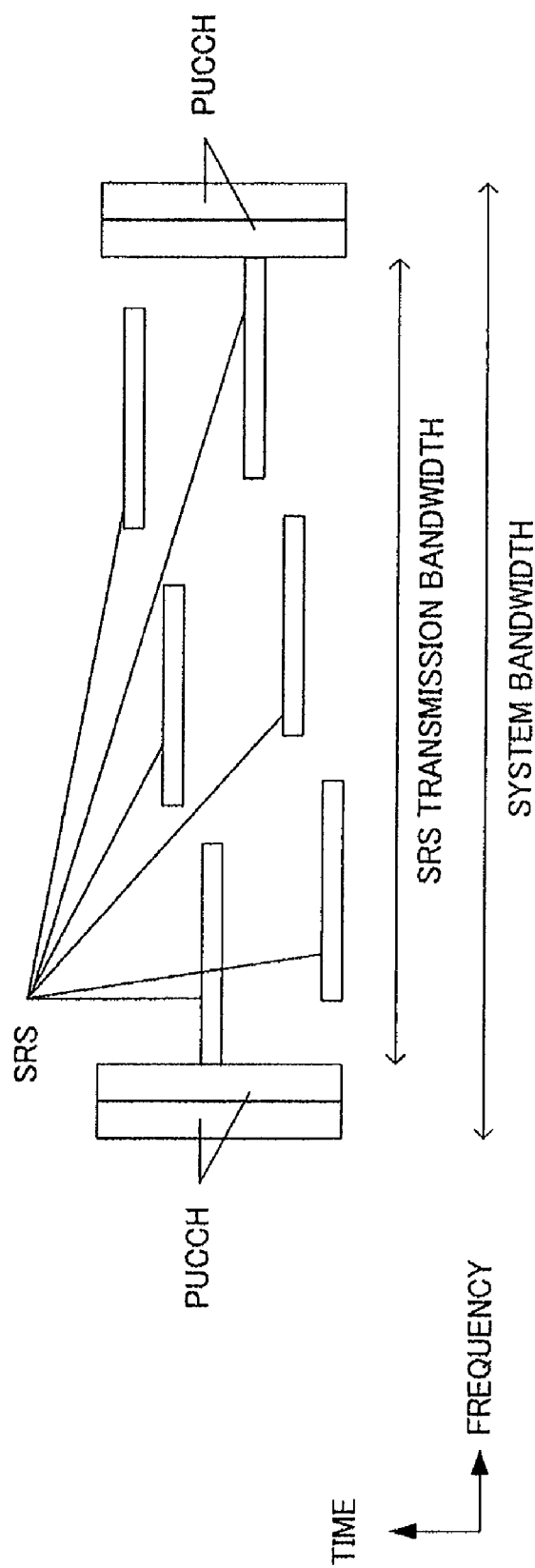
FIG. 15B shows an allocation example (example 2) of SRSs determined in an example of the SRS allocation determination section according to the present invention.

Further, as shown in FIG. 15A, SRSs may be mapped so as to neighbor PUCCHs. Further, as shown in FIG. 15B, allocation of SRSs may vary between hopping cycles.

Further, an SRS may be named as simply a "pilot signal," "reference signal" and so on.

Further, a known signal used for an SRS may include a CAZAC sequence or a sequence having the same characteristics as a CAZAC.

Further, the SRS allocation information acquired in the base station according to the above embodiments may be reported to mobile stations using a PDCCH (Physical Downlink Control Channel), which is an L1/L2 control channel, or using a PDSCH (Physical Downlink Shared Channel) as an L3 message.

Further, in the above embodiments, DFT-s-OFDM (Discrete Fourier Transform-spread-Orthogonal Frequency Division Multiplexing) employed in LTE may be adopted to the uplink.

Further, in the above embodiments, OFDM employed in LTE may be adopted to downlink.

Further, the SRS allocation information according to the above embodiments may be uniquely associated in advance with a broadcast channel, for example, PUCCH configuration information reported in a BCH (Broadcast Channel). By this means, it is not necessary to transmit SRS allocation information on a per UE basis, so that signaling overhead is reduced. For example, each UE may calculate SRS allocation from the number of PUCCH channels as follows.

Now, an example of equations to calculate SRS allocation from the number of PUCCH channels will be shown below.

If the subcarrier to which an SRS starts to be mapped in the frequency domain is $k_0$, $k_0$ is represented as the following equation 2.

[1]

$$k_0 = k_{RB}(n) \cdot N_{SC}^{RB} \quad \text{(Equation 2)}$$

In equation 2, n represents the multiplexing number of an SRS in the frequency domain and $N_{SC}^{RB}$ represents the number of subcarriers per RB. Further, $k_{RB}(n)$ represents the RB number to which the SRS with frequency multiplex number n is mapped and is represented by the following equation 3 or 4.

(Equation 3)

$$k_{RB}(n) = \quad [2]$$
$$N_{SRS}^{BASE} + \left\lfloor (n+1) \cdot \frac{N_{RB}^{UL} - N_{RB}^{PUCCH} - N_{SRS}^{BASE} \cdot N_{SRS}}{N_{SRS} + 1} \right\rfloor + \left\lfloor \frac{N_{RB}^{PUCCH}}{2} \right\rfloor$$
$$n = 0, 1, \ldots N_{SRS} - 1$$

(Equation 4)

$$k_{RB}(n) = \quad [3]$$
$$n \cdot N_{SRS}^{BASE} + \left\lfloor (2n+1) \cdot \frac{N_{RB}^{UL} - N_{RB}^{PUCCH} - N_{SRS}^{BASE} \cdot N_{SRS}}{2N_{SRS}} \right\rfloor + \left\lfloor \frac{N_{RB}^{PUCCH}}{2} \right\rfloor$$
$$n = 0, 1, \ldots N_{SRS} - 1$$

In equations 3 and 4, $N_{SRS}$ represents the number of SRSs to be frequency-multiplexed and is represented by the following equation 5.

(Equation 5)

$$N_{SRS} = \left\lfloor \frac{N_{RB}^{UL} - N_{RB}^{PUCCH}}{N_{SRS}^{BASE}} \right\rfloor \quad [4]$$

In equations 3, 4 and 5, $N_{RB}^{PUCCH}$ represents the number of RBs included in the PUCCH transmission band and $N_{RB}^{UL}$ represents the number of RBs included in the system band. $N_{SRS}^{BASE}$ represents the number of RBs included in the SRS transmission bandwidth.

In the above parameters, the parameters other than $N_{RB}^{PUCCH}$ are system parameters, so that the system parameters can be used in a fixed manner once they are signaled or reported. Accordingly, when a mobile station is given $N_{RB}^{PUCCH}$, SRS allocation is able to be derived according to the above equation 2 to equation 5. Here, $N_{RB}^{PUCCH}$ is the parameter determined by the number of PUCCH channels, so that a mobile station is able to derive SRS allocation and transmit SRSs if the mobile station is provided the number of PUCCH channels from the base station.

Further, the mobile station may derive SRS allocation from the number of PUCCH channels with reference to an SRS allocation definition table instead of above equation 2 to equation 5. FIG. 16 shows an example of the SRS allocation definition table. The SRS allocation definition table shown in FIG. 16 defines the RB numbers of RBs to which SRSs are mapped in cases where the number of PUCCH channels is one and four. Further, t represents a transmission timing in hopping cycles. Further, as shown in FIG. 16, the hopping patterns vary according to varying multiplexing number of SRSs to n. Further, "–" in the table shows that SRSs are not allocated. By holding an SRS allocation definition table, a mobile station is able to derive SRS allocation and transmit SRSs if the mobile station is provided the number of PUCCH channels from the base station.

Further, the information uniquely associated in advance with PUCCH configuration information may include other SRS configuration information including variable information about the above SRS bandwidth and SRS sequence information, in addition to the SRS allocation information.

Further, although examples have been explained with the above embodiments where the narrowband SRS bandwidths evenly cover one SRS transmission bandwidth in the frequency domain, the present invention is not limited to this, and, with the present invention, one SRS transmission bandwidth is divided into a plurality of smaller SRS transmission bandwidths (hereinafter "SRS subbands") and the narrowband SRS bandwidths may be mapped so as to cover each SRS subband bandwidth evenly in the frequency domain.

Figure 17A:
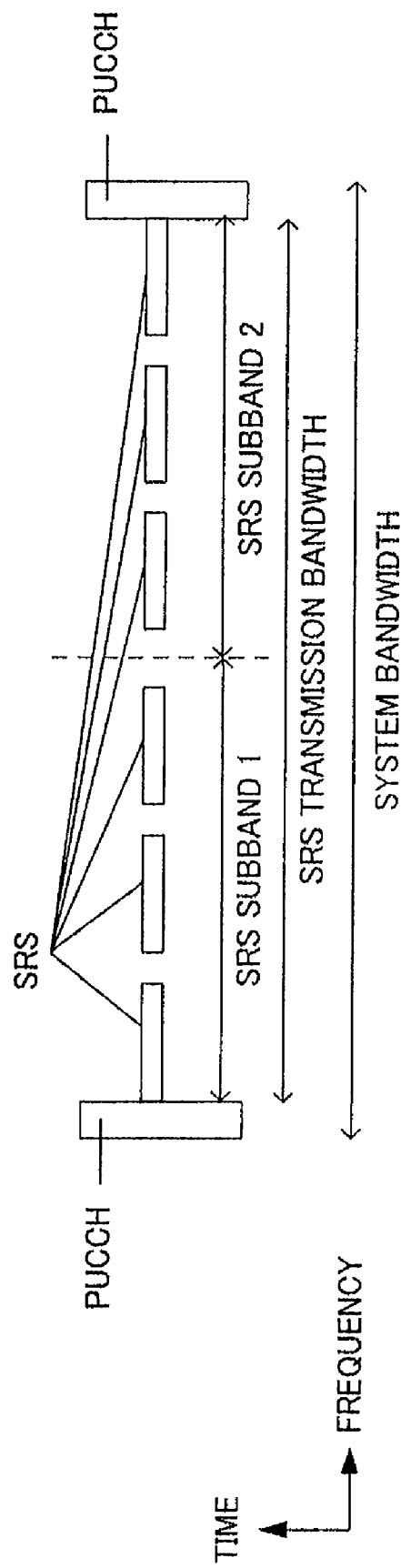
FIG. 17A shows an allocation example (example 3) of SRSs determined in an example of the SRS allocation determination section according to the present invention.
Figure 17B:
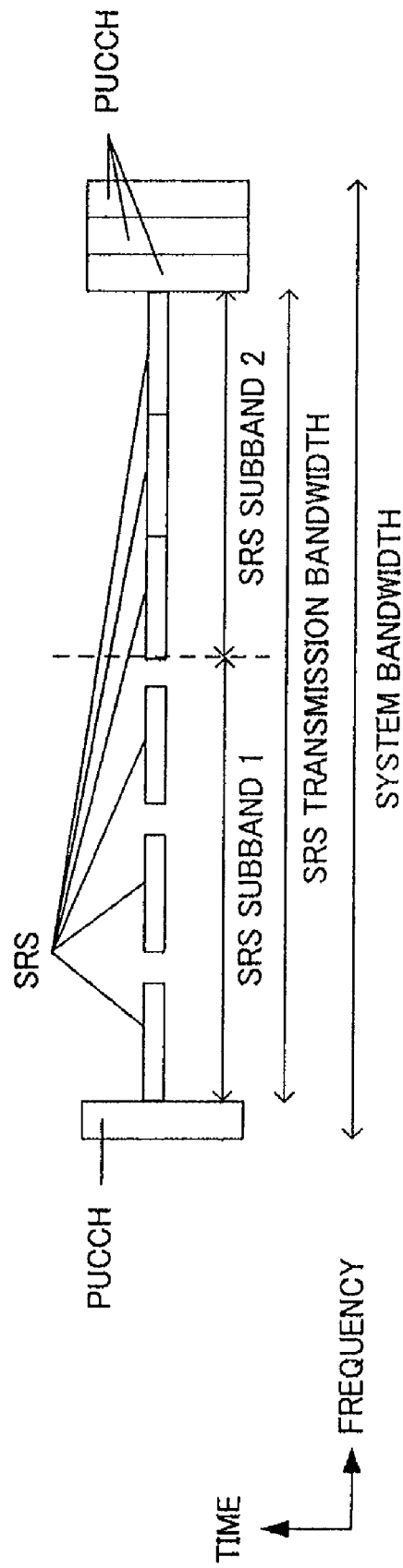
FIG. 17B shows an allocation example (example 3) of SRSs determined in an example of the SRS allocation determination section according to the present invention.

FIGS. 17A and 17B show an example of a case where two SRS subbands 1 and 2 are provided in one SRS transmission bandwidth and three SRSs are mapped to each subband.

In the example shown in FIG. 17A, the allocation and the intervals of SRSs mapped in SRS subband 1 are changed according to the variation of a bandwidth of SRS subband 1 such that CQI estimation bandwidth is covered evenly in SRS subband 1. Likewise, the allocation and the intervals of SRSs mapped in SRS subband 2 are changed according to the variation of a bandwidth of SRS subband 2 such that CQI estimation bandwidth is covered evenly in SRS subband 2.

Further, as in the example shown in FIG. 17B, the bandwidths of SRS subbands may vary. In this case, the allocation and the intervals of SRSs mapped in SRS subbands may be changed on a per SRS subband basis such that CQI estimation bandwidth is evenly covered.

Although a case has been explained as an example where the number of SRS subbands is two in FIGS. 17A and 17B, the number of SRS subbands may be three or more with the present invention. Further, although a case has been explained as an example where the number of SRSs in the SRS subband is three in FIGS. 17A and 17B, with the present invention, a plurality of SRSs besides three SRSs may be mapped in the SRS subband.

Figure 18A:
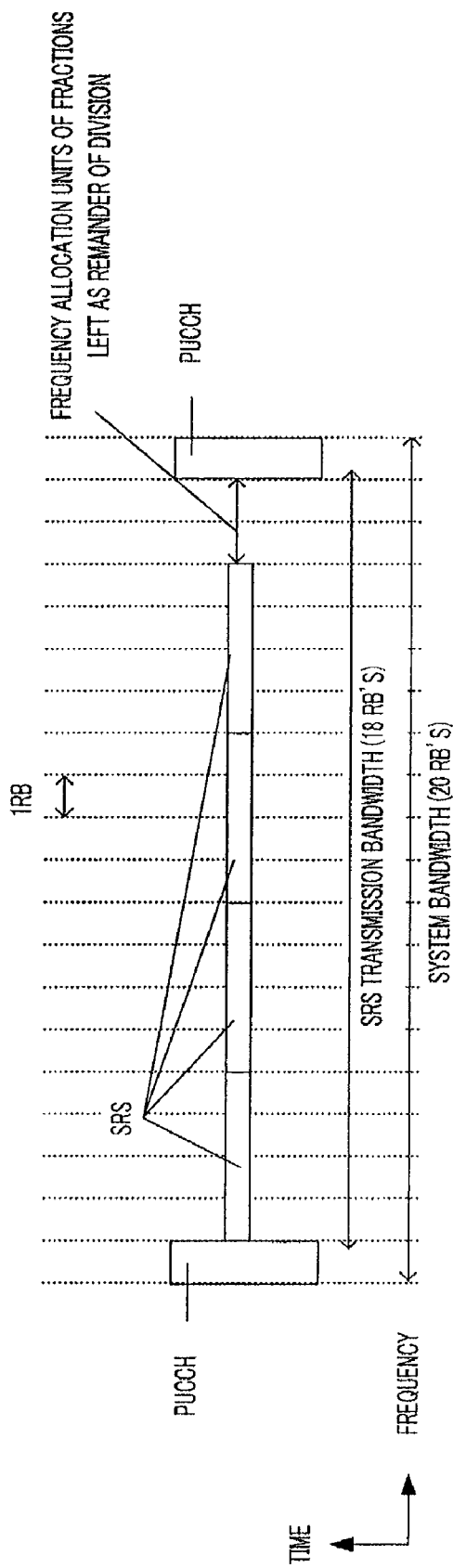
FIG. 18A shows an allocation example (example 4) of SRSs determined in an example of the SRS allocation determination section according to the present invention.

Further, although mapping examples have been explained with the above embodiments where SRSs are neighboring each other evenly in the SRS transmission bandwidth, in practical systems, SRS bandwidths and positions where SRSs are allocated in the frequency domain are discrete values. Therefore, cases may occur where the SRS transmission bandwidth is not divided by one SRS band. In this case, without using frequency allocation units that have fractions left as a remainder of division, it is also possible to map SRSs so as to cover the CQI estimation bandwidth evenly in the frequency domain in a range that is divisible (FIG. 18A). Further, it is also possible to allocate frequency allocation units that have fractions left as a remainder of division between SRSs on a per frequency unit basis (FIG. 18B).

Figure 18B:
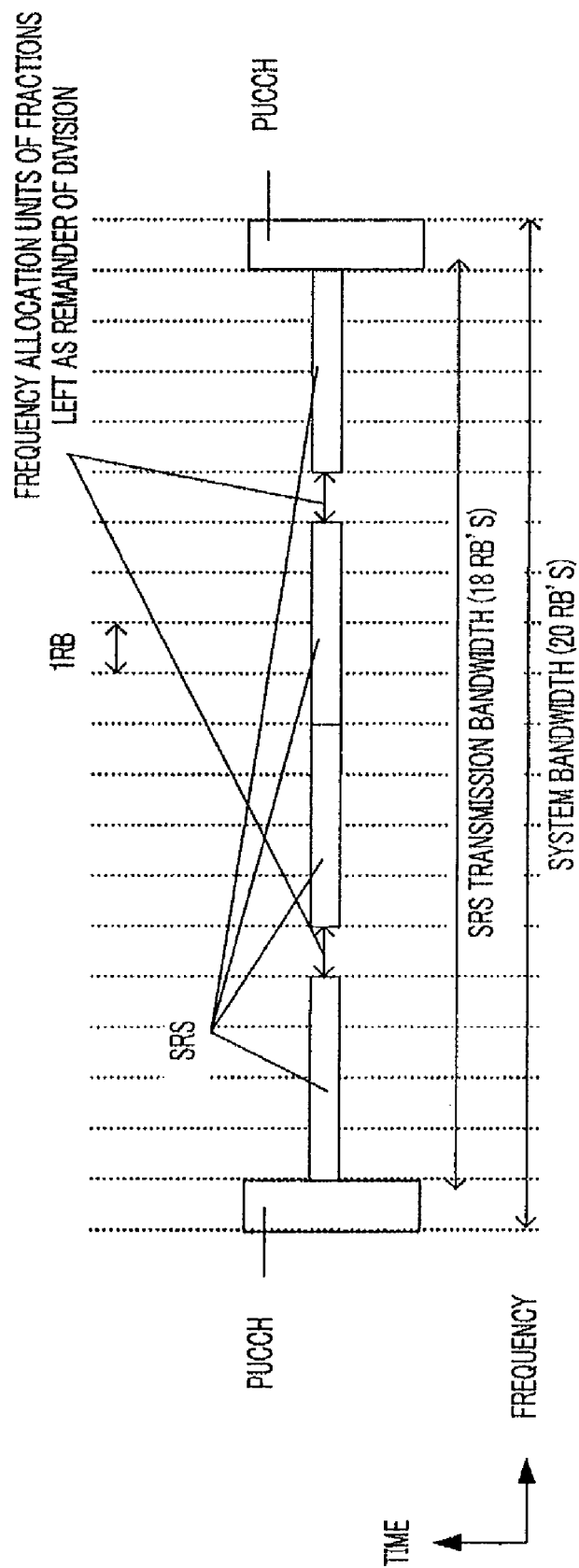
FIG. 18B shows an allocation example (example 4) of SRSs determined in an example of the SRS allocation determination section according to the present invention.

Here, the RB (Resource Block) in FIGS. 18A and 18B represents an allocation unit in the frequency domain. FIGS. 18A and 18B are examples where the SRS bandwidth is 4 RBs and the SRS transmission bandwidth is 18 RBs.

Further, although cases have been explained with the above embodiments where SRSs are frequency-hopped (frequency-multiplexed) in the SRS transmission bandwidth at predetermined time intervals, the present invention is not limited to this, and provides the same advantage as in cases where frequency hopping is not carried out, as explained with the above embodiments.

The SRSs in the above embodiments may be mapped in RB units or subcarrier units, and may not be limited to any unit.

Further, a CQI showing channel quality information may be referred to as "CSI (Channel State Information)."

Further, a base station apparatus may be referred to as "Node B" and a mobile station may be referred to as "UE."

Further, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2007-211548, filed on Aug. 14, 2007, and Japanese Patent Application No. 2008-025535, filed on Feb. 5, 2008, including the specifications, drawings and abstracts, are incorporated herein by reference in their entirety.

INDUSTRIAL APPLICABILITY

The present invention is applicable to, for example, mobile communication systems.

The invention claimed is:

1. An integrated circuit for controlling a radio communication process, the process being configurable to transmit a reference signal with a wide bandwidth without frequency hopping or to transmit the reference signal with a narrow bandwidth with frequency hopping, and the process comprising:
mapping the reference signal to a frequency resource, which has the narrow bandwidth that is fixed regardless of variation of the wide bandwidth in a given system bandwidth, wherein the frequency resource is uniformly dispersed in a frequency band of the wide bandwidth depending on the variation of the wide bandwidth; and
transmitting the mapped reference signal.

2. The integrated circuit according to claim 1, wherein a plurality of different wide bandwidths are configurable in the given system bandwidth.

3. The integrated circuit according to claim 1, wherein the reference signal is mapped to a plurality of the frequency resources, wherein the frequency resource with the narrow bandwidth is a unit of transmission.

4. The integrated circuit according to claim 1, wherein the reference signal is mapped to a plurality of the frequency resources into which a frequency band of the wide bandwidth is uniformly divided, wherein the frequency resource with the narrow bandwidth is a unit of transmission.

5. The integrated circuit according to claim 1, wherein the reference signal is mapped to a plurality of the frequency resources, a number of which is different depending on the variation of the wide bandwidth, wherein the frequency resource with the narrow bandwidth is a unit of transmission.

6. The integrated circuit according to claim 1, wherein the reference signal is mapped to a plurality of the frequency resources, each of which has a different frequency band, wherein the frequency resource with the narrow bandwidth is a unit of transmission.

7. The integrated circuit according to claim 1, wherein the reference signal is mapped to a plurality of the frequency resources, which cover the entire frequency band of the wide bandwidth, wherein the frequency resource with the narrow bandwidth is a unit of transmission.

8. The integrated circuit according to claim 1, wherein the reference signal is mapped to a plurality of the frequency resources by frequency hopping, wherein the frequency resource with the narrow bandwidth is a unit of transmission.

9. The integrated circuit according to claim 1, wherein the reference signal is mapped to a plurality of the frequency resources, which cover the entire frequency band of the wide bandwidth, by frequency hopping, wherein the frequency resource with the narrow bandwidth is a unit of transmission.

10. The integrated circuit according to claim 1, wherein the reference signal is mapped to a plurality of resources, which are the frequency resources and which are different time resources, wherein the frequency resource with the narrow bandwidth is a unit of transmission.

11. The integrated circuit according to claim 1, wherein the reference signal is mapped to a plurality of resources, which are the frequency resources and which are different time resources by a predetermined time interval, wherein the frequency resource with the narrow bandwidth is a unit of transmission.

12. The integrated circuit according to claim 1, wherein the radio communication process to be controlled further comprises receiving control information related to a mapping of the reference signal, and the reference signal is mapped based on the control information.

13. The integrated circuit according to claim 1, wherein in the given system bandwidth where a control channel is mapped at both ends thereof, the wide bandwidth varies while its central frequency remains the same.

14. An integrated circuit for controlling a radio communication process, the process being configurable to have a mobile station apparatus transmit a reference signal with a wide bandwidth without frequency hopping or with a narrow bandwidth with frequency hopping, and the process comprising:
   setting a mapping of the reference signal;
   transmitting, to the mobile station apparatus, control information related to the mapping of the reference signal; and
   receiving the reference signal which is mapped to a frequency resource based on the control information and which is transmitted from the mobile station apparatus, wherein the wide bandwidth varies in a given system bandwidth, and the mapping of the reference signal is set such that the reference signal is mapped to a frequency resource, which has the narrow bandwidth that is fixed regardless of variation of the wide bandwidth, and the frequency resource is uniformly dispersed in a frequency band of the wide bandwidth depending on the variation of the wide bandwidth.

15. The integrated circuit according to claim 14, wherein a plurality of different wide bandwidths are configurable in a system bandwidth.

16. The integrated circuit according to claim 14, wherein the mapping of the reference signal is set such that the reference signal is mapped to a plurality of the frequency resources, wherein the frequency resource with the narrow bandwidth is a unit of transmission.

17. The integrated circuit according to claim 14, wherein the mapping of the reference signal is set such that the reference signal is mapped to a plurality of the frequency resources into which a frequency band of the wide bandwidth is uniformly divided, wherein the frequency resource with the narrow bandwidth is a unit of transmission.

18. The integrated circuit according to claim 14, wherein the mapping of the reference signal is set such that the reference signal is mapped to a plurality of the frequency resources, a number of which is different depending on the variation of the wide bandwidth, wherein the frequency resource with the narrow bandwidth is a unit of transmission.

19. The integrated circuit according to claim 14, wherein the mapping of the reference signal is set such that the reference signal is mapped to a plurality of the frequency resources, each of which has a different frequency band, wherein the frequency resource with the narrow bandwidth is a unit of transmission.

20. The integrated circuit according to claim 14, wherein the mapping of the reference signal is set such that the reference signal is mapped to a plurality of the frequency resources, which cover the entire frequency band of the wide bandwidth, wherein the frequency resource with the narrow bandwidth is a unit of transmission.

21. The integrated circuit according to claim 14, wherein the mapping of the reference signal is set such that the reference signal is mapped to a plurality of the frequency resources by frequency hopping, wherein the frequency resource with the narrow bandwidth is a unit of transmission.

22. The integrated circuit according to claim 14, wherein the mapping of the reference signal is set such that the reference signal is mapped to a plurality of the frequency resources, which cover the entire frequency band of the wide bandwidth, by frequency hopping, wherein the frequency resource with the narrow bandwidth is a unit of transmission.

23. The integrated circuit according to claim 14, wherein the mapping of the reference signal is set such that the reference signal is mapped to a plurality of resources, which are the frequency resources and which are different time resources, wherein the frequency resource with the narrow bandwidth is a unit of transmission.

24. The integrated circuit according to claim 14, wherein the mapping of the reference signal is set such that the reference signal is mapped to a plurality of resources, which are the frequency resources and which are different time resources by a given time interval, wherein the frequency resource with the narrow bandwidth is a unit of transmission.

25. The integrated circuit according to claim 14, wherein in the given system bandwidth where a control channel is mapped at both ends thereof, the wide bandwidth varies while its central frequency remains the same.

\* \* \* \* \*